US008131607B2

(12) United States Patent
Park et al.

(10) Patent No.: US 8,131,607 B2
(45) Date of Patent: Mar. 6, 2012

(54) DEVICE AND METHOD OF PLANNING AND MANAGING REAL-TIME POSTAL DELIVERY WORK

(75) Inventors: Moon Sung Park, Daejeon (KR); Eun Hye Kim, Seoul (KR); Wan Seok Kim, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 711 days.

(21) Appl. No.: 12/155,129

(22) Filed: May 29, 2008

(65) Prior Publication Data

US 2009/0076933 A1    Mar. 19, 2009

(30) Foreign Application Priority Data

Sep. 13, 2007  (KR) ......................... 10-2007-0092998

(51) Int. Cl.
*G06Q 30/00* (2006.01)
*G06Q 10/00* (2006.01)
(52) U.S. Cl. ............................................. 705/28; 705/7
(58) Field of Classification Search ...................... 705/28
See application file for complete search history.

(56) References Cited

U.S. PATENT DOCUMENTS

| | | | | |
|---|---|---|---|---|
| 5,586,036 | A * | 12/1996 | Pintsov | 705/408 |
| 6,894,234 | B1 | 5/2005 | Sottong | |
| 7,079,981 | B2 | 7/2006 | Keller et al. | |
| 2002/0103724 | A1 * | 8/2002 | Huxter | 705/28 |
| 2003/0208368 | A1 * | 11/2003 | Campbell | 705/1 |
| 2004/0030604 | A1 * | 2/2004 | Young | 705/26 |
| 2005/0114188 | A1 * | 5/2005 | Soga et al. | 705/7 |
| 2006/0010086 | A1 * | 1/2006 | Klein | 705/410 |
| 2006/0102531 | A1 * | 5/2006 | Conard et al. | 209/584 |
| 2006/0122729 | A1 * | 6/2006 | Murphy et al. | 700/222 |
| 2006/0184403 | A1 * | 8/2006 | Scott et al. | 705/7 |
| 2006/0229895 | A1 * | 10/2006 | Kodger | 705/1 |
| 2007/0050312 | A1 | 3/2007 | Park et al. | |
| 2007/0250326 | A1 * | 10/2007 | Kadaba | 705/1 |
| 2007/0265876 | A1 * | 11/2007 | Campbell | 705/1 |
| 2008/0308623 | A1 * | 12/2008 | McDonald | 235/375 |
| 2010/0138355 | A1 * | 6/2010 | Kodger, Jr. | 705/333 |
| 2011/0046775 | A1 * | 2/2011 | Bailey et al. | 700/224 |

FOREIGN PATENT DOCUMENTS

| | | |
|---|---|---|
| JP | 2003-146440 | 5/2003 |
| KR | 10-2006-0027205 | 3/2006 |
| KR | 10-0734627 | 6/2007 |

OTHER PUBLICATIONS

Hoon Jung et al., "Integration of GIS, GPS, and optimization technologies for the effective control of parcel delivery service", Computers & Industrial Engineering 2006, www.sciencedirect.com, 9 pages. Hideki Bando, "Processing of Undeliverable Mail As Addressed in Japan", 13th International Conference on Postal Automation, pp. 1-4.
"Development of Real-Time Postal Logistics Operation System", the Ministry of Information and Communication, Dec. 31, 2006, pp. 11-74.
Korean Office Action mailed May 21, 2008 and issued in corresponding Korean Patent Application 10-2007-0092998.

* cited by examiner

*Primary Examiner* — Elaine Gort
*Assistant Examiner* — Ashford S Hayles
(74) *Attorney, Agent, or Firm* — Staas & Halsey LLP

(57) ABSTRACT

The present invention relates to a system and method of planning and managing real-time postal delivery work that formulates a delivery plan according to a delivery workload in real time, provides information about the delivery plan, and provides and manages information about collection work of returned and confirmed mail items.

19 Claims, 9 Drawing Sheets

DEVICE AND METHOD OF PLANNING AND MANAGING REAL-TIME POSTAL DELIVERY WORK

CROSS-REFERENCE TO RELATED APPLICATION

This application claims priority to and the benefit of Korean Patent Application No. 10-2007-0092998 filed in the Korean Intellectual Property Office on Sep. 13, 2007, the entire contents of which are incorporated herein by reference.

BACKGROUND OF THE INVENTION (a) Field of the Invention

The present invention relates to a system and method of planning and managing real-time postal delivery work. More particularly, the present invention relates to a system and method of planning and managing real-time postal delivery work that formulates a delivery plan according to delivery workload in real time, provides information about the delivery plan, and provides and manages information about collection work of returned and confirmed mail items.

(b) Description of the Related Art

A mail center is generally located in a metropolitan area where a large quantity of mail items are received and delivered. The quantity of mail items to be delivered from the metropolitan area to a local area is large, while the quantity of mail items to be delivered from the local area to the metropolitan area is small. At present, there is no method that can effectively control the flow of mail items. Accordingly, it is difficult to improve traffic quality, and to detect and cope with a factor for bottlenecks due to a rapid increase in the quantity of mail items.

In the related art, a technology for logistics automation and delivery service is known, which achieves efficient delivery and receipt of items. According to this technology, there is provided a method that can efficiently perform delivery work or receipt work of mail items having a large volume, or of small volume mail items such as special mail items or home-delivered parcels, using transportation vehicles.

In addition, various methods have been used to process the mail items. For example, there is known a method that provides a logistics service by receiving delivery confirmation from a recipient and acquiring receipt request information, a method that registers a plurality of destination addresses and delivers mail items on the basis of information about a registered delivery request area, and a method that, if a mail item is put into a mailbox (i.e., receptacle), allows a mail carrier to confirm the mail item, thereby achieving ease of collection.

Meanwhile, an automatic sorting process function is maximized by inserting a zip code into a barcode. However, there is a problem in that a mail item may be received with no barcode for automatic sorting that should be printed during the receipt procedure.

To overcome such a problem, there is suggested a method that uses a barcode for an automatic process when an address or a zip code is not recognized during the automatic sorting process, a method that calculates postal charges on the basis of the result of automatic sorting of received mail items, thereby effectively supporting generation and receipt of a quantity of mail items, and a method that attaches a label for ease of an automatic process of returned mail items and mail items to be resent due to reports of change of address.

In the related art, the delivery and collection routes are generated on the basis of the quantity of mail items. At this time, the quantity information may depend on information that is input by a receptionist or a sender who sends a mail item for delivery, and the delivery work may be performed in the same district, street, or block, rather than to remote locations. In addition, during the receipt, information such as address information or a recipient name needs to be input for delivery confirmation.

When the related art is applied to a general postal service, the following need to be taken into consideration.

First, in a case of a general mail item that is directly received from an individual, a delivery address may not be input. Then, if a customer himself/herself inputs a delivery address as receipt information for each mail item during the receipt work, a receipt waiting time may be increased, and thus receipt work may not be normally performed.

Second, when a large quantity of mail items are received, delivery address information files are all received, and it takes a lot of computer resources, network bandwidths for transmission to delivery post offices, and operational costs to receive receipt data, to calculate the quantity information from a large quantity of information, and to transmit the quantity information to the delivery post offices.

Third, unlike parcels (i.e., home-delivered parcels), which are of a small quantity and require high postal charges, in the case of the general mail items, which are of a large quantity and do not require delivery confirmation, information for efficient automatic sorting processing, information about pre-sorting for calculating postal charges (e.g., quantity information according to first 3 digits or 6 digits of the zip code, or the sorting machine ID), and information about presence/absence of a barcode are received. In this case, however, since a large number of delivery locations exist and information about the delivery locations is lacking, it may be difficult to generate a delivery plan and a delivery route in advance and manage the delivery plan and the delivery route.

In the related art described above, even if a large quantity of mail items are received in the mail center, the dispatch and arrival sorting work are performed without delay. However, in the delivery post offices, the quantity of mail items to be delivered may exceed the actual delivery capability of the postman (i.e., deliveryman). In this case, the traffic quality may be deteriorated, and thus the delivery quality may not be secured.

Furthermore, the general mail item must be delivered within 3 days from the date the mail item is received. A mail item may often arrive at the delivery post office through a mail center a day before the scheduled delivery completion date. Then, the traffic quality may be changed according to the quantity of mail items to be delivered.

Accordingly, there is a need for a method that can enable the mail items to be effectively delivered without delay when the quantity of mail items to be delivered is large. In addition, it is necessary to provide information about the quantity of mail items to be delivered for calculating the workload of the delivery post office in advance according to a variation in information about the quantity of mail items to be received, for formulating a work plan on the basis of the scheduled quantity of mail items to arrive (i.e., scheduled arrival time) according to a dispatch sorting work result in the mail center, and for taking countermeasures when the quantity exceeds the average.

That is, there is a need for a system for planning and managing postal delivery work that can enable each delivery post office to detect a variation in the workload in advance on the basis of information when a large quantity of mail items are received, such that the postal delivery work can be effectively performed. Furthermore, it is necessary to provide and manage information for computing a criterion for defining the criteria of the average quantity of postal items to be processed, the maximum quantity of mail items to be processed, and the minimum quantity of mail items to be processed in the delivery post office, and generating a ratio (i.e., the criterion of the maximum quantity of mail items to be delivered) according to the monthly or yearly distribution of the quantity of mail items, to thereby effectively manage the manpower and instruments as the resources.

SUMMARY OF THE INVENTION

The present invention has been made in an effort to provide a system and method of planning and managing real-time postal delivery work, having an advantage of providing information about a real-time delivery plan according to delivery workload based on a delivery date, a delivery post office, and a delivery zone, and providing information about collection work of returned and confirmed mail items.

In addition, the present invention has been made in an effort to provide a system and method of planning and managing real-time postal delivery work, having an advantage of transmitting information about the quantity of mail items by types to a delivery post office, such that the delivery post office formulates a delivery plan in advance, determines delivery workload after a mail center performs dispatch and arrival sorting work and provides information about a delivery plan for effective delivery work, effectively adjusts the delivery workload to eliminate a factor for delivery delay, and enables collection work of mail items to be effectively performed at a delivery location where no mail items are delivered, thereby preventing postal service quality from being deteriorated.

To achieve the above-described objects, according to the present invention, a system is implemented that formulates a plan for postal delivery work in real time based on a method of receiving individual mail items or a plurality of mail items and acquiring information about the quantity of mail items to be collected and the quantity of mail items to be processed, distributes the mail items among postal zones and entrusted and residential postal zones in consideration of the quantity of mail items to be received and the quantity of mail items to be delivered so as to prevent a factor for delivery delay in advance, generates information about delivery locations, mail items (i.e., returned and confirmed mail items), and collection locations to provide information for effective collection work of mail items, and manages the execution results to perform efficient delivery work, thereby preventing the postal service quality from being deteriorated.

According to an exemplary embodiment of the present invention, a system for planning and managing real-time postal delivery work includes: a receipt and sorting work quantity information acquiring and transmitting block that sorts quantity information by types after a post office and a mail center perform receipt, collection, and sorting work; a postal logistics operating block that transmits, to each delivery post office, the quantity information from the receipt and sorting work quantity information acquiring and transmitting block to use as calculation criterion information of a scheduled delivery quantity for formulating a real-time delivery plan; a real-time postal logistics delivery planning and managing block that sorts the quantity information from the receipt and sorting work quantity information acquiring and transmitting block, performs calculation of delivery-zone-based and delivery-route-based scheduled delivery quantities, detection of an excess of delivery workload calculation of the quantities of entrusted and residential delivery zones, and calculation of the quantities of delivery-zone-based intermediate depositories, generates a delivery route in consideration of a criterion date of special mail item traffic quality and then calculates a general mail item delivery quantity, and provides a postman with information about the postal delivery work; and a delivery and collection work information acquiring and transmitting block that registers a delivery location and a delivery quantity through barcode or RFID tag recognition at a delivery completion location during the postal delivery work with reference to the delivery route and the quantity information generated by the real-time postal logistics delivery planning and managing block, confirms a collection box, and registers information about a collection quantity at a delivery location at which collection is to be performed, during the collection work, and transmits the registration results to the real-time postal logistics delivery planning and managing block.

The real-time postal logistics delivery planning and managing block may allocate a collection route of a returned/confirmed mail item on the basis of information about delivery locations, excluding the delivery completion location, on the delivery-zone-based delivery route, and may provide the collection route to the delivery and collection work information acquiring and transmitting block.

The system for planning and managing a real-time postal delivery work may further include a unit that, when the work result of the delivery and collection work information acquiring and transmitting block is registered in the real-time postal logistics delivery planning and managing block, generates and registers delivery-zone-based and delivery-location-based daily weight values on the basis of the total delivery quantity and collection quantity according to the delivery and collection work result, and stores the registered result values in a temporary depository to be used in the real-time postal delivery plan logistics.

The system for planning and managing real-time postal delivery work may further include a unit that eliminates a factor for delivery delay in advance to distribute the delivery workload of the delivery post office, generates the real-time postal delivery plan for eliminating a factor for deterioration of postal service quality in advance, and manages the execution result.

The system for planning and managing real-time postal delivery work may further include a recipient delivery schedule notification and confirmation result transmitting block that, when a mail item is a special mail item, directly transmits the special mail item to a recipient, when a mail item is a mail item that requires confirmation, transmits information on scheduled delivery date and time based on the delivery route generation result by e-mail or message on a mobile phone to the recipient, and transmits the confirmation result from the recipient to the real-time postal logistics delivery planning and managing block.

The receipt and sorting work quantity information acquiring and transmitting block may include: a unit that acquires receipt quantity information and the quantity information according to the dispatch sorting and arrival sorting work in the mail center, calculates a daily and scheduled arrival-time-based scheduled arrival quantity in real time, and generates and provides the delivery plan and the delivery route; a unit that provides the result of the dispatch sorting and arrival sorting work in the mail center; and a unit that provides quantity information according to the result of the sorting work in a delivery sequence of general mail items and the result of the sorting work in a delivery sequence of special mail items.

The receipt and sorting work quantity information acquiring and transmitting block may include: a post office collection and receipt quantity information transmitting unit that transmits quantity information, which is acquired through a registration process of information about a mailbox collection quantity by the post office, to the postal logistics operating block and the real-time postal logistics delivery planning and managing block; a quantity-of-postal-items receipt quantity information acquiring and transmitting unit that acquires quantity information in the post office and the mail center according to conditions from companies that send a quantity of mail items, and transmits the acquired quantity information to the postal logistics operating block and the real-time postal logistics delivery planning and managing block; a mail-center-dispatch sorting work result acquiring and transmitting unit that, that, from the formulation result of the delivery plan of the real-time postal logistics delivery planning and managing block, acquires zip-code-based processing information from a sorting machine and transmits the acquired information to the postal logistics operating block and the real-time postal logistics delivery planning and managing block when a mail item is a general mail item, if the dispatch sorting work in the mail center is completed; a mail-center-arrival sorting work result acquiring and transmitting unit that, if the arrival sorting work in the mail center is completed, acquires zip-code-based processing information from the sorting machine, and transmits the acquired information to the postal logistics operating block and the real-time postal logistics delivery planning and managing block; a delivery sequence sorting work result acquiring and transmitting unit that, on the basis of the postman-based and delivery-sequence-based automatic sorting results from the sorting machine acquired by the mail center or the delivery post office, acquires postman-based and delivery-based processing information, and transmits the acquired information to the real-time postal logistics delivery planning and managing block; and a first gateway that interfaces between the postal logistics operating block and the real-time postal logistics delivery planning and managing block.

The receipt and sorting work quantity information acquiring and transmitting block may further include a quantity information classifying and transmitting unit that classifies the quantity information acquired by the post office collection and receipt quantity information transmitting unit and the quantity-of-postal-items receipt quantity information acquiring and transmitting unit, and transmits the classified quantity information to the postal logistics operating block and the real-time postal logistics delivery planning and managing block. The quantity information classifying and transmitting unit may classify the quantity information according to a post office ID, delivery date and time, and a receipt quantity when the quantity information is information about the quantity of general mail items, may classify the quantity information according to a registration number (customer ID+receipt number), a receipt post office ID, receipt date and time, a recipient zip code, and a mailing direction when the quantity information is information about a quantity of special mail items, and may classify the quantity information according to a mailing direction, the level of presorting (mail center ID, sorting machine ID, delivery post office ID, first 3 digits of the zip code, or 6 digits of the zip code), a zip-code-based quantity, presence/absence of a barcode, a receipt post office ID, and receipt date and time when the quantity information is information about the quantity of temporarily received or received quantity of mail items, and may acquire the receipt quantity information.

The receipt and sorting work quantity information acquiring and transmitting block may further include a unit that generates information about the number of destination-based postal boxes through manual sorting, the result of presorting, and the result of zip-code-based dispatch sorting through automatic sorting.

The postal logistics operating block may include: a unit that compares the quantity information from the receipt and sorting work quantity information acquiring and transmitting block with past delivery-post-office-based quantity information, and provides delivery-post-office-based quantity information; a unit that receives the result of a real-time postal logistics postal delivery work plan from the real-time postal logistics delivery planning and managing block, and calculates and manages a ratio of the delivery-post-office-based quantity according to the delivery-post-office-based execution result; and a unit that manages delivery-post-office-based traffic quality and workload according to the delivery result.

The postal logistics operating block may include: a delivery-post-office-based actual result managing unit that manages a weight value in consideration of a delivery route between a receipt post office and a delivery post office and time elapsed according to a work method in the mail center, and a ratio of past delivery-post-office-based delivery quantity information; a unit that receives the information transmitted from the receipt and sorting work quantity information acquiring and transmitting block, and calculates a delivery-post-office-based scheduled arrival quantity according to the quantity of received general mail items on the basis of an increase ratio of mail items at the same time as in the past and a ratio of delivery quantity information among the delivery post offices at the same time; a unit that calculates a delivery-post-office-based daily scheduled quantity on the basis of the zip-code-based quantity information, the level of presorting, and the quantity information using the quantity-of-postal-items receipt quantity information; a delivery-post-office-based scheduled quantity calculating unit that, in a case of a special mail item, generates scheduled quantity information to arrive at each delivery post office on the basis of a receipt date and a receipt post office; a comparing unit that compares the scheduled quantity information generated by the delivery-post-office-based scheduled quantity calculating unit with the value registered in the delivery-post-office-based actual result managing unit; and a unit that transmits the comparison results by the comparing unit to the real-time postal logistics delivery planning and managing block through a second gateway.

The real-time postal logistics delivery planning and managing block may include: a unit that calculates delivery-zone-based and delivery-route-based quantities using the quantity information acquired by the receipt and sorting work quantity information acquiring and transmitting block; a unit that calculates delivery-post-office-based and delivery-zone-based delivery workload using a quantity ratio according to the manual sorting result acquired by the postal logistics operating block, and generates and transmits delivery quantity information with an error in delivery quantity that is minimized; a unit that calculates the quantity of mail items to be transported to the intermediate depositories in consideration of postman-based delivery quantity and delivery route, and calculates and transmits an intermediate-location-based transport quantity; a unit that calculates the quantity of mail items to be transported to the intermediate depositories in consideration of postman-based delivery quantity and delivery route, and calculates and transmits an intermediate-location-based transport quantity; a unit that generates delivery route information to include a general mail item delivery route in consideration of a condition for maintaining the special mail item traffic quality, and transmits the generated delivery route information; a unit that receives the transmission result, generates a travel route for collection, and provides a postman that conducts the collection work with the changed collection route; a unit that selects reference groups through comparison of a past actual delivery quantity with a delivery zone quantity, generates and transmits quantity information about mail items to be delivered, and formulates the delivery plan on the basis of the values; and a unit that manages traffic quality according to the delivery and collection work result and an entrusted delivery result, and when the traffic quality is not repeatedly maintained, provides an administrator with information for postman supplement and delivery zone adjustment on the basis of delay factor information.

The real-time postal logistics delivery planning and managing block may include: a delivery-zone-based scheduled quantity calculating unit that acquires delivery-post-office-based scheduled quantity information, and compares a ratio of past delivery-zone-based delivery quantity information with data acquired from the receipt and collection quantity to calculate a delivery-zone-based scheduled postal delivery work quantity; a delivery-zone-based/delivery-route-based scheduled delivery quantity calculating unit that calculates a delivery-location-based scheduled delivery quantity using a ratio of a past daily delivery result and a ratio of a scheduled delivery quantity for each delivery zone; an excessive delivery workload detecting unit that detects a delivery zone that suffers from excessive delivery workload on the basis of a delivery-zone-based daily scheduled quantity, selects an area having a high delivery density, and generates information for delivery zone adjustment; an entrusted and residential delivery area quantity calculating unit that confirms registration information of an entrusted/residential deliverable resource for an area having a high daily delivery density from the result calculated by the excessive delivery workload detecting unit, if the corresponding information exists, allocates scheduled delivery quantity information to an entrusted postal zone, and generates and transmits a scheduled delivery quantity to the entrusted postal zone; a unit that, after the delivery quantity of the entrusted delivery zone is excluded through the delivery-zone-based/delivery-route-based scheduled delivery quantity calculating unit, the excessive delivery workload detecting unit, and the entrusted and residential delivery area quantity calculating unit, recalculates the delivery-zone-based delivery quantity; an intermediate-location-based transport quantity calculating unit that transports daily general and special mail items, and calculates and provides the quantity of mail items to be transported to the intermediate depositories in consideration of the delivery-zone-based delivery quantity; a special mail item receipt result criterion delivery route generating unit that calculates zip-code-based quantity information for the special mail items, excluding the general mail items, calculates a delivery location using address information of a residence, generates a delivery route on the basis of scheduled delivery completion time of the delivery location, such that traffic quality is maintained, and reallocates a route for the special mail items in reflection of a customer name, a receipt request date-and-time value, and a delivery location among the receipt result from a recipient; a mobile gateway that interfaces between the delivery and collection work information acquiring and transmitting block and the recipient delivery schedule notification and confirmation result transmitting block; a message transmitting/receiving module that checks a connection state to the mobile gateway so as to transmit the generation result of the delivery route by the special mail item receipt result criterion delivery route generating unit to the recipient through the recipient delivery schedule notification and confirmation result transmitting block, generates and transmits a message for transmitting a scheduled delivery date-and-time message, and receives the delivery result from the delivery and collection work information acquiring and transmitting block; and a special/general mail item delivery route generating unit that generates a condition satisfying the delivery completion time of special mail items by reflecting the delivery location information of general mail items in the delivery route generated by the special mail item receipt result criterion delivery route generating unit, generates delivery route information including a delivery sequence of the general mail items in consideration of the generated condition, and generates the delivery route according to the acquisition result by the receipt and sorting work quantity information acquiring and transmitting block.

The real-time postal logistics delivery planning and managing block may further include: a delivery-zone-based delivery quantity estimating and adjusting unit that receives information about the number of destination-based postal boxes through manual sorting, the result of presorting, and the result of zip-code-based dispatch sorting and arrival sorting through automatic sorting from the receipt and sorting work quantity information acquiring and transmitting block, compares changes in the delivery-zone-based delivery quantity and calculates a difference so as to adjust a scheduled delivery post office arrival date and determine the scheduled delivery quantity as the delivery quantity, and generates a daily delivery quantity; a unit that, when the difference in the changes of the delivery-zone-based delivery quantity calculated by the delivery-zone-based delivery quantity estimating and adjusting unit is large, including when a special mail item delay factor occurs, checks a large-changed scheduled delivery quantity on the basis of the post office collection and receipt quantity and the quantity-of-postal-items receipt quantity, and if a difference in the ratio of the scheduled delivery quantity calculated based on the manual sorting quantity and the post office collection and receipt quantity is more than a predetermined reference value, recalculates the daily, delivery-zone-based, and delivery-route-based delivery quantities; a unit that changes input date and time and quantity information, and repeatedly performs the generation of the delivery route so as to reformulate the delivery plan by reflecting the scheduled delivery quantity in the dispatch sorting and arrival sorting work result; a unit that, in a case of a mail item that is received at a delivery post office and is to be delivered in the corresponding zone, registers delivery quantity information such that the mail item is to be delivered the day after the receipt date, and reflects the delivery quantity information in formulating the delivery plan; and a unit that provides the delivery route information, the calculation result of the intermediate depository transport quantity, and the calculation results of the quantities of the entrusted and residential delivery zones.

The real-time postal logistics delivery planning and managing block may further include: a returned and confirmed mail item collection location generating unit that generates a travel route for the collection work and provides a mail item collection vehicle and collection route information to a person who is responsible for the collection work; a collection work result registering unit that registers a collection work result input from the delivery and collection work information acquiring and transmitting block; a unit that, when the delivery completion result is registered in the postman work result storing and delivery delay factor detecting unit, generates and stores information about a delivery location to which a postman does not visit, and registers the corresponding delivery location as a delivery location at which collection is to be performed; a unit that registers delivery completion quantity and collection quantity information in the postal logistics operating block; a postman work result storing and delivery delay factor detecting unit that receives the delivery completion result transmitted from the delivery and collection work information acquiring and transmitting block, registers the delivery completion result, compares the delivery and collection work result with the condition for maintaining the special mail item traffic quality generated before the delivery, and provides information about delay-delivered mail items; and a delivery zone and delivery-route-based actual result managing unit that generates and registers ratios of delivery-zone-based and delivery-location-based delivery and collection quantity information for calculation of the scheduled delivery quantity using history information of the delivery result.

The real-time postal logistics delivery planning and managing block may further include: a unit that formulates a primary delivery plan based on receipt information using the route generated by the special/general mail item delivery route generating unit; and a unit that compares the daily delivery quantity generated by the delivery-zone-based delivery quantity estimating and adjusting unit with the received dispatch sorting work result, and changes the daily delivery quantity to determined delivery quantity information to formulate a secondary delivery plan.

The delivery and collection work information acquiring and transmitting block may include: a unit that registers the delivery location by recognizing the barcode or the RFID tag attached to the collection box during the delivery work, and when the returned and confirmed mail items exist, acquires and registers a delivery-location-based returned and confirmed mail item collection quantity and recipient information; and a unit that transmits the information about the delivery completion location at predetermined time intervals during the delivery, or when the delivery result is more than a predetermined quantity, transmits the delivery result to the real-time postal logistics delivery planning and managing block so as to generate a collection route for collecting the returned/confirmed mail item at a delivery location to which the postman does not visit during the delivery.

The delivery and collection work information acquiring and transmitting block may include: a delivery and delivery confirmation information acquiring unit that, when only a general mail item is put into the collection box during the delivery, recognizes the barcode or the RFID tag attached to the collection box and inputs the delivery quantity, and when a special mail item is put into the collection box, acquires delivery location information in signature information and delivery quantity information as delivery completion information, and provides next scheduled delivery location information when the delivery is completed; a unit that, when the postman delivers mail items using the delivery route information from the real-time postal logistics delivery planning and managing block, causes the postman to put a mail item into the collection box, and in a case of a special mail item, to recognize with a PDA a registration barcode or an RFID tag, to display a screen for the signature of the recipient, and to register a delivery completion result after the signature of the recipient is received; a unit that, when a general mail item is put into the collection box or when a returned/confirmed mail item exists in the collection box, recognizes the barcode or the RFID tag attached to the collection box, and inputs a delivery quantity and a collection quantity; a delivery completion location information transmitting unit that transmits data of the delivery completion result to the real-time postal logistics delivery planning and managing block in consideration of power of the PDA or the cumulative amount of the delivery completion information, and when the delivery is completed, registers the delivery completion information in the real-time postal logistics delivery planning and managing block; a returned/confirmed mail item collecting unit that, when a mail item to be collected exists at a delivery location on the collection route according to the collection route information transmitted from the real-time postal logistics delivery planning and managing block, inputs information about a collected mail item quantity; a unit that, when a mail item is collected from a returned mail item box or a confirmed mail item box at a delivery location to which the postman visits, registers corresponding information through the PDA; and a unit that before returning to the delivery post office after completing the delivery, receives collection route information for an area neighboring the delivery completion location and performs collection work before returning to the delivery post office.

According to another embodiment of the present invention, a method of planning and managing real-time postal logistics postal delivery work includes: calculating a postal delivery work quantity for formulating a delivery plan by calculating a scheduled delivery quantity using receipt and collection quantity information; generating a delivery route such that delivery quality of a special mail item is maintained and a general mail item is also delivered along with the special mail item; acquiring arrival quantity information and formulating a postal delivery work plan for actual delivery with respect to the postal delivery work plan generated based on the receipt quantity; completing the formulation of the real-time postal logistics delivery plan by delivery date or scheduled delivery date; acquiring information for acquiring and managing delivery work according to the formulation result of the real-time postal logistics delivery plan and a delivery work result, and information about a location at which a mail item is to be collected; and processing the information for managing the delivery result, preparing collection work for a mail item to be collected, and processing a collection result.

The calculating of the postal delivery work quantity may include: receiving personal mail items at a post office, collecting mail items at a mailbox, and acquiring a post office receipt and collection quantity information; when a general mail item is received, transmitting a receipt post office ID, receipt date and time, a mailing direction, and quantity information to a postal logistics operating block; causing the postal logistics operating block to sort the mail items by mailing direction and service, and in a case of a general mail item, calculating a delivery-post-office-based scheduled delivery quantity at the same time as in the past on the basis of a ratio of a past delivery post office arrival quantity to the total receipt quantity; calculating a scheduled-arrival-date-based scheduled delivery quantity on the basis of a receipt location using the calculated delivery-post-office-based scheduled delivery quantity; calculating a delivery-zone-based daily scheduled delivery quantity of a corresponding delivery post office on the basis of a monthly/weekly/weekday ratio of data of past delivery-zone-based actual delivery results; calculating a daily delivery-route-based scheduled delivery quantity on the basis of a monthly/weekly/weekday ratio of data of a delivery-location-based actual delivery result on a past delivery route; checking an excess of delivery-zone-based delivery workload so as to check whether or not a delivery delay factor exists; when an excess of the delivery-zone-based delivery workload is detected, selecting delivery zones, in which the excess of the delivery workload occurs, as candidates of entrusted and residential delivery zones; checking whether or not a corresponding delivery zone is registered as a candidate of the entrusted and residential delivery zone on a scheduled delivery date; and when the corresponding delivery zone is registered as a candidate of the entrusted and residential delivery zone on the scheduled delivery date, allocating and notifying a scheduled delivery quantity and a scheduled delivery zone.

The calculating of the postal delivery work quantity may further include, when the corresponding delivery zone is not registered as a candidate of the entrusted and residential delivery zone on the scheduled delivery date, reallocating a delivery zone in consideration of equalization of postman-based delivery workload.

The calculating of the postal delivery work quantity may further include, when the excess of the delivery-zone-based delivery workload is not detected, calculating and providing the quantity of mail items to be transported to delivery-zone-based intermediate depositories.

The calculating of the postal delivery work quantity may include: acquiring quantity information of a quantity of mail items to be temporarily received or received through a post office and a mail center; transmitting receipt quantity information by receipt post office ID, receipt date and time, presorting, 3-digit or 6-digit sorting, and presence/absence of barcode to the postal logistics operating block; when a special mail item is received at the post office and the mail center, acquiring special mail item information; transmitting information about a receipt post office ID, a registration number, and a recipient to the postal logistics operating block; calculating a delivery-post-office-based scheduled arrival quantity based on how many days the mail items are transported from a receipt post office and a dispatch mail center to an arrival mail center and a work time weight value using the receipt information of the quantity of mail items and the special mail item; calculating a delivery-zone-based scheduled arrival quantity using the calculated delivery-post-office-based scheduled arrival quantity; calculating a delivery-zone-based daily scheduled delivery quantity of a corresponding delivery post office on the basis of a monthly/weekly/weekday ratio of data of past delivery-zone-based actual delivery results; calculating a daily and delivery-route-based scheduled delivery quantity on the basis of a monthly/weekly/daily ratio of data of a delivery-location-based actual delivery result on a past delivery route; checking an excess of delivery-zone-based delivery workload so as to check whether or not a delivery delay factor exists; when an excess of the delivery-zone-based delivery workload is detected, selecting delivery zones, in which the excess of the delivery workload occurs, as candidates of entrusted and residential delivery zones; checking whether or not a corresponding delivery zone is registered as a candidate of the entrusted and residential delivery zone on a scheduled delivery date; and when the corresponding delivery zone is registered as a candidate of the entrusted and residential delivery zone on the scheduled delivery date, allocating and notifying a scheduled delivery quantity and a scheduled delivery zone.

The generating of the delivery route may include: calculating a delivery location of a special mail item among the scheduled delivery quantity and a traffic quality duration; registering an expected delivery completion time at the coordinates of the delivery location; checking whether or not the condition that it is within a predetermined time after the receipt is satisfied; when the condition is satisfied, generating the delivery route of the special mail item; after the delivery route is generated; checking whether or not a customers request is reflected therein; if the customer's request is reflected therein, allocating the delivery route according to an appointed time, and notifying the customer of the changed scheduled delivery date and time; checking whether or not allocation of a delivery route for a general mail item, which is to be delivered along with the special mail items, is requested; and when the allocation of the delivery route for the general mail item is not requested, generating a delivery-zone-based delivery route, and calculating entrusted delivery-zone-based and intermediate-depository-based transport quantities.

The generating of the delivery route may further include, when the allocation of the general mail item delivery route is requested, registering information about a delivery location of the general mail item that is to be delivered along with the special mail items, between the delivery locations of the special mail items, and then re-generating a delivery route in reflection of an addition result of the delivery location of the general mail item to the special mail item delivery route.

The generating of the delivery route may further include: if the customer's request is not reflected, notifying the customer of scheduled delivery completion time, a reply expiration time, a message transmission method, and in a case of a phone request, generating and registering a message; checking whether or not a reply request time has expired, checking a reply message, and checking whether or not a change request message exists; and checking delivery request date and time and a registration number of a postal number, and if they are correct, changing delivery date and time of a mail item to be delivered, for which a change is requested by the received message or a phone call, and re-generating a delivery route in reflection of the changed result.

The formulating of the postal delivery work plan may include: after the mail center performs dispatch and arrival sorting, generating a work result through automatic sorting from the sorting work result; checking whether or not automatic dispatch sorting or arrival sorting is completed; if the dispatch sorting or arrival sorting is completed, acquiring information about a mail center ID, processing completion date and time, mailing-direction-based and zip-code-based quantities, a registration number, and the number of postal boxes as information about the automatic dispatch sorting or arrival sorting work result; checking whether a mail item is a special mail item or a general mail item; when a mail item is a special mail item, detecting whether or not a factor for delayed arrival time exists, and comparing the arrival time with receipt date and time to calculate a delay time; and when the delay time is more than a predetermined time, generating and transmitting the delay time and a list of registration numbers of the mail items, and re-generating a delivery route for a delivery post office and a delivery zone on the basis of the corresponding information.

The formulating of the postal delivery work plan may further include: when a mail item is a general mail item, transmitting data of the sorting work result; sorting through arrival sorting and dispatch sorting, and calculating delivery-post-office-based, delivery-zone-based, and scheduled-delivery-date-based delivery quantities; check a deviation in the dispatch sorting delivery quantity and an excess of reference delivery workload; checking whether or an excess of delivery workload occurs; and when the excess of delivery workload occurs, only generating and transmitting daily, delivery-post-office-based, and delivery-zone-based deviation-occurrence quantity information, and re-generating the delivery-zone-based scheduled delivery quantity.

The formulating of the postal delivery work plan may further include, when a mail item is not subject to automatic sorting, recognizing a barcode or an RFID tag attached to a postal box, grasping the number of postal boxes to be transported to the delivery post office or the mail center for the arrival sorting work, and converting the number of postal boxes to acquire a delivery quantity.

The completing of the formulation of the real-time postal logistics delivery plan may include: if the sorting work of mail items to be delivered is completed through a delivery sequence sorting machine, acquiring the result of the delivery sequence sorting work; checking whether or not a delivery sequence sorting work for special mail items is completed; when the delivery sequence sorting work for the special mail items is completed, acquiring delivery-zone-based and delivery-location-based quantities; detecting delay time of the special mail items; and when the delay time is more than a predetermined time, generating and transmitting the delay time and a list of registration numbers of the mail items, and re-generating a delivery route for a delivery post office and a delivery zone on the basis of the corresponding information.

The completing of the formulation of the real-time postal logistics delivery plan may further include: checking whether or not automatic delivery sequence sorting for general mail items is completed; when the automatic delivery sequence sorting for the general mail items is completed, acquiring delivery-zone-based and delivery-location-based mail item quantities; comparing the acquired delivery quantity information with the previously formulated delivery-zone-based delivery quantity information to check a deviation in the delivery-zone-based delivery quantity deviation and an excess of reference delivery workload; and when the excess of the delivery-zone-based delivery workload occurs, generating and transmitting daily, delivery-post-office-based, and delivery-zone-based deviation-occurrence quantity information, and re-generating a delivery-zone-based scheduled delivery quantity.

The completing of the formulation of the real-time postal logistics delivery plan may further include: checking whether or not manual delivery sequence sorting is completed; when the manual delivery sequence sorting is completed, calculating a quantity through a delivery quantity counter by manual sorting work result or converting the number of postal boxes into the delivery quantity; comparing the calculated or converted delivery quantity information with the previously formulated delivery-zone-based delivery quantity information to check a deviation in the delivery-zone-based delivery quantity deviation and an excess of reference delivery workload; and when the excess of the delivery-zone-based delivery workload occurs, generating and transmitting daily, delivery-post-office-based, and delivery-zone-based deviation-occurrence quantity information, and re-generating a delivery-zone-based scheduled delivery quantity.

The acquiring of the information about the location at which a mail item is to be collected may include: causing a postman to check whether or not the corresponding location is a delivery location where a special mail item among mail items is to be delivered; causing the postman to check whether or not a recipient signs, and to register the delivery result of the special mail item; checking in consideration of power of a PDA whether or not a processing result needs to be stored; and when the processing result needs to be stored, transmitting the processing result.

The acquiring of the information about the location at which a mail item is to be collected may further include: causing the postman to check whether or not a general mail item to be put into a collection box or whether or not a mail item to be collected exists in a returned and confirmed mailbox; recognizing a barcode or an RFID tag attached to the collection box; causing the postman to check whether or not the delivery is completed, and to input a collection box delivery and collection quantities; causing the postman to check whether or not a mail item to be collected exists, to collect the mail item, and to input the mailing direction of a collected mail item and a quantity by service; comparing the collection details and the travel details based on the delivery input result; checking in consideration of power of a PDA whether or not a processing result needs to be stored; and when the processing result needs to be stored, transmitting the processing result.

The acquiring of the information about the location at which a mail item is to be collected may further include: when the processing result does not need to be stored, checking whether or not the delivery is completed; when the delivery is not completed, checking a mail item to be next delivered and searching an intermediate depository at which a mail item is to be collected; checking whether or not a mail item at the intermediate depository is to be collected; and when the mail item at the intermediate depository needs to be collected, causing the postman to move to the intermediate depository, to perform mail item collection and confirmation, and to repeatedly perform the acquiring of the management information and the information about the location at which a mail item is to be collected.

The acquiring of the information about the location at which a mail item is to be collected may further include: when the delivery is completed, calculating a time to spare of the postman before the postman returns to the delivery post office; and checking whether or not the time to spare exists, receiving collection route information for an area neighboring a delivery completion location, and causing the postman to perform a collection work again before the postman returns to the delivery post office.

The preparing of the collection work and the processing of the collection result may include: receiving the delivery details during the delivery-zone-based delivery and registering the delivery result; performing selection of a delivery-zone-based delivery route section and registration of a delivery completion location and a collection completion location; generating an optimum travel route for collection using the coordinates of delivery locations, excluding the delivery and collection completion locations; transmitting route information to a person who is responsible for mail item collection; receiving the route information such that the person who is responsible for mail item collection moves to the location at which a mail item is to be collected; recognizing a barcode or an RFID tag attached to a collection box at the corresponding delivery location; checking whether or not a returned/confirmed mail item exists; if the returned/confirmed mail item exists, causing the postman to collect the mail item and to input the mailing direction of a collected mail item and a mail item quantity by service; providing and displaying positional information to move to a next delivery location; checking whether or not the collection work is completed; and when the collection work is completed, displaying completion, and causing the postman to register the collection details after the postman returns to the delivery post office.

The preparing of the collection work and the processing of the collection result may further include: checking whether or not an operation to store the delivery details of the completed postal delivery work is completed; when the delivery details are stored or the collection details are registered, registering the corresponding delivery location at which the delivery and collection work are completed; calculating the ratios of the delivery-zone-based and delivery-location-based delivery quantities based on the total delivery quantity of the corresponding delivery zone; registering the calculated ratios of the delivery-zone-based and delivery-location-based delivery quantities as the actual delivery result of the corresponding delivery post office; registering information for managing the delivery-zone-based actual delivery result according to delivery location arrival time, signature time, the delivery quantity, the collection quantity, and required time for delivery of the delivery result; and comparing a condition for special mail item delivery quality and the delivery result, and registering and managing information about a delayed delivery location.

According to the embodiments of the present invention, while the mail item is received, collected, and finally delivered, the traffic quality can be maintained, and the real-time postal logistics delivery plan can be formulated to efficiently perform the delivery work. In addition, the delivery and collection work plan and the delivery and collection route information can be provided so as to prevent the delivery quality from being deteriorated due to a delay during the collection work of the returned and confirmed mail items, thereby improving the mail item delivery quality.

According to the embodiments of the present invention, the change in the delivery quantity can be detected in advance, and thus an abnormality in which the delivery quantity is increased can be detected, thereby eliminating the factor for the delivery delay. Accordingly, until the delivery is completed, the traffic quality can be maintained. In addition, the delivery and collection mail item processing capability of the delivery post office can be improved, and thus the mail item delivery and collection work can be efficiently performed. Furthermore, the existing postal logistics resources can be efficiently run, and the reliability of the traffic quality can be secured.

BRIEF DESCRIPTION OF THE DRAWINGS

An exemplary embodiment of the present invention will be described in detail with reference to the accompanying drawings for clear understanding of advantages of the present invention, wherein.

DETAILED DESCRIPTION OF THE EMBODIMENTS

Figure 1:
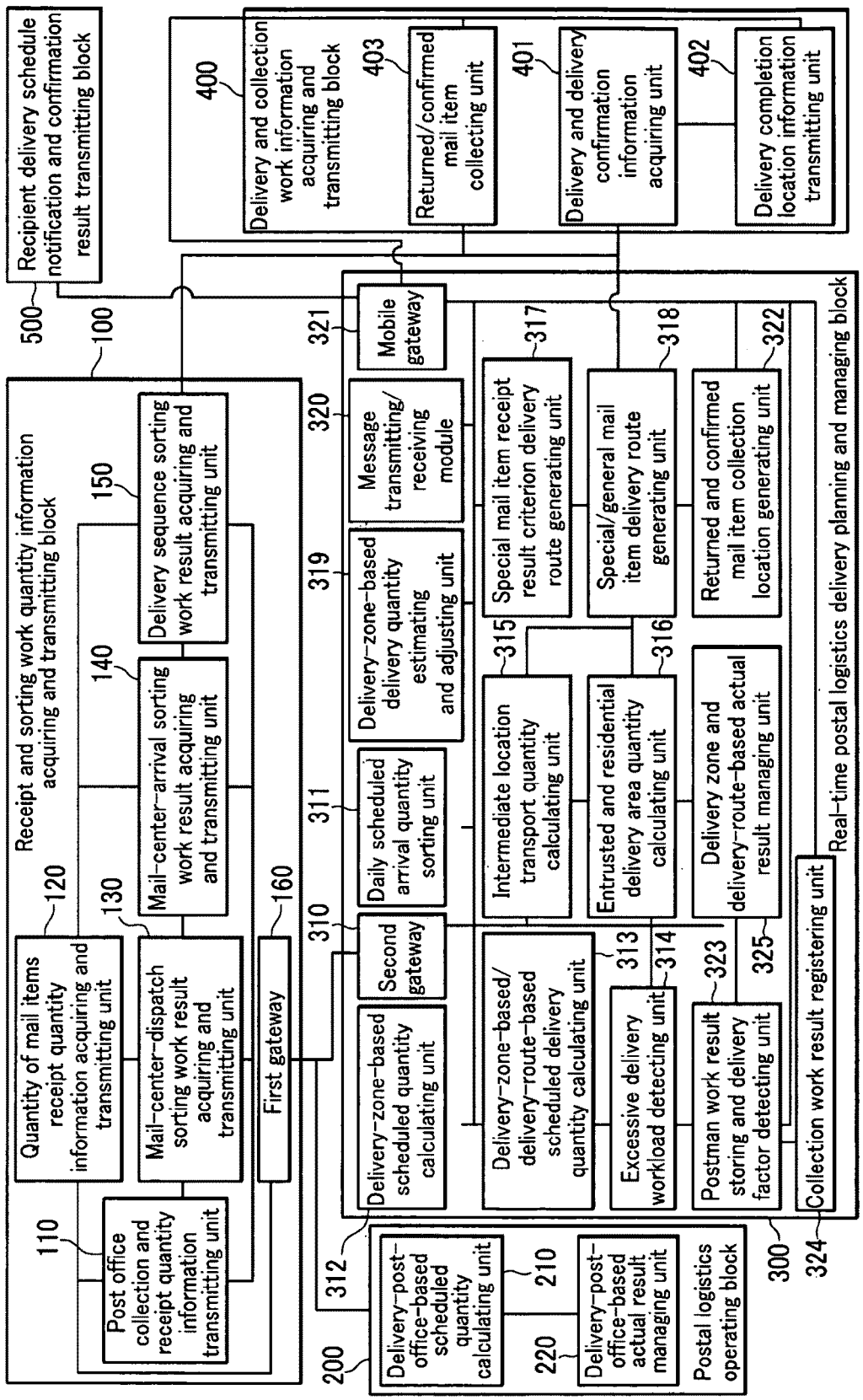
FIG. 1 is a block diagram showing the configuration of a system for planning and managing real-time postal delivery work according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. The term "section", "-er (-or)", or "module" used herein mean a unit that processes at least one function or operation. This can be implemented by hardware.

A system and method of planning and managing real-time postal delivery work according to an exemplary embodiment of the present invention will now be described in detail with reference to the drawings.

FIG. 1 is a diagram showing the overall configuration of a system for planning and managing real-time postal delivery work according to an exemplary embodiment of the present invention.

As shown in FIG. 1, a system for planning and managing real-time postal delivery work according to an exemplary embodiment of the present invention includes a receipt and sorting work quantity information acquiring and transmitting block 100, a postal logistics operating block 200, a real-time postal logistics delivery planning and managing block 300, and a delivery and collection work information acquiring and transmitting block 400.

The receipt and sorting work quantity information acquiring and transmitting block 100 refers to a receipt and sorting work quantity information acquiring and transmitting system according to an exemplary embodiment of the present invention that performs receipt, collection, and sorting work through a post office and a mail center (logistics distribution center), and sorts quantity information by types.

The postal logistics operating block 200 refers to a postal logistics operating system that transmits the quantity information from the receipt and sorting work quantity information acquiring and transmitting block 100 as calculation criterion information of a scheduled delivery quantity for formulating a real-time delivery plan.

The real-time postal logistics delivery planning and managing block 300 refers to a real-time postal logistics delivery planning and managing system that sorts the quantity information from the receipt and sorting work quantity information acquiring and transmitting block 100, performs calculation of delivery-zone-based and delivery-route-based scheduled delivery quantities, detection of an excess of delivery workload, calculation of quantities of entrusted and residential delivery zones, and calculation of quantities of delivery-zone-based intermediate depositories, generates a delivery route in consideration of a criterion date of special mail item traffic quality (i.e., delivery completion date and time) and then calculates a general mail item delivery quantity, and provides a PDA of a postman with information about the postal delivery work. The real-time postal logistics delivery planning and managing block 300 allocates a collection route of a returned/confirmed mail item on the basis of information about delivery locations, excluding the delivery completion location, on the delivery-zone-based delivery route, and provides the collection route to the delivery and collection work information acquiring and transmitting block 400.

The delivery and collection work information acquiring and transmitting block 400 refers to a delivery and collection work information acquiring and transmitting system that registers a delivery location and a delivery quantity through barcode or RFID tag recognition at a delivery completion location during the postal delivery work with reference to the delivery route and the quantity information generated by the real-time postal logistics delivery planning and managing block 300, transmits the registration result of the delivery location and the delivery quantity to the real-time postal logistics delivery planning and managing block 300, and confirms a collection box and registers information about a collection quantity at a delivery location at which collection is to be performed, during the collection work based on a collection route for returned and confirmed mail items, which is generated by the real-time postal logistics delivery planning and managing block 300 using information about delivery locations, excluding the delivery completion location, on a delivery-zone-based delivery route.

The system for planning and managing real-time postal delivery work according to an exemplary embodiment of the present invention further includes a unit (for convenience of explanation, not shown in the drawing) that, when the work result of the delivery and collection work information acquiring and transmitting block 400 is registered in the real-time postal logistics delivery planning and managing block 300, generates and registers delivery-zone-based and delivery-location-based daily weight values on the basis of the total delivery quantity and collection quantity according to the delivery and collection work result, and stores the registered result values in a temporary depository to be used in the real-time postal delivery plan logistics.

The system for planning and managing real-time postal delivery work according to an exemplary embodiment of the present invention may further include a unit (for convenience of explanation, not shown in the drawing) that effectively distributes the delivery workload of the delivery post office among the receipt and sorting work quantity information acquiring and transmitting block 100, the postal logistics operating block 200, the real-time postal logistics delivery planning and managing block 300, and the delivery and collection work information acquiring and transmitting block 400, to thereby eliminate a factor for delivery delay in advance. The system for planning and managing real-time postal delivery work according to an exemplary embodiment of the present invention may further include a unit (for convenience of explanation, not shown in the drawing) that generates a real-time delivery plan that is capable of eliminating the factor for causing the deterioration of the postal service quality in advance, and manages the execution result.

The system for planning and managing real-time postal delivery work according to an exemplary embodiment of the present invention further includes a unit 500 (hereinafter, referred to as "recipient delivery schedule notification and confirmation result transmitting block") that, when a mail item is a special mail item, directly transmits the special mail item to a recipient, and when a mail item is a mail item that requires confirmation, transmits information on scheduled delivery date and time based on the delivery route generation result by e-mail or message on a mobile phone to the recipient, and transmits the confirmation result from the recipient who receives the message to the real-time postal logistics delivery planning and managing block 300. The recipient delivery schedule notification and confirmation result transmitting block 500 generates a response message to the recipient delivery schedule notification result only when a change request is input, and transmits the generated response message to the real-time postal logistics delivery planning and managing block 300.

At this time, the real-time postal logistics delivery planning and managing block 300 reflects the reply result from the recipient delivery schedule notification and confirmation result transmitting block 500 in the delivery route reallocation, thereby performing the postal delivery work.

First, the receipt and sorting work quantity information acquiring and transmitting block 100 includes: a unit that acquires receipt (including collection) quantity information and the quantity information according to the dispatch sorting and arrival sorting work in the mail center, calculates a daily and scheduled arrival-time-based scheduled arrival quantity in real time, and generates and provides the delivery plan and the delivery route; a unit that provides the results of the dispatch and arrival sorting work in the mail center such that accurate delivery-post-office-based and delivery-zone-based quantities can be calculated and provided for the dispatch sorting and arrival sorting work through the mail center; and a unit that provides quantity information according to the result of the sorting work in a delivery sequence of general mail items (based on the result of automatic sorting in the delivery sequence) and the result of the sorting work in a delivery sequence of special mail items (subject to a delivery confirmation service).

The configuration of the receipt and sorting work quantity information acquiring and transmitting block 100 will now be described in detail. As shown in FIG. 1, the receipt and sorting work quantity information acquiring and transmitting block 100 includes a post office collection and receipt quantity information transmitting unit 110, a quantity-of-postal-items receipt quantity information acquiring and transmitting unit 120, a mail-center-dispatch sorting work result acquiring and transmitting unit 130, a mail-center-arrival sorting work result acquiring and transmitting unit 140, a delivery sequence sorting work result acquiring and transmitting unit 150, and a first gateway 160.

The post office collection and receipt quantity information transmitting unit 110 transmits the quantity information acquired through registration of quantity information of mail items collected from a mailbox by the post office to the postal logistics operating block 200 and the real-time postal logistics delivery planning and managing block 300 through the first gateway 160.

The quantity-of-postal-items receipt quantity information acquiring and transmitting unit 120 acquires quantity information in the post office and the mail center (logistics distribution center) according to conditions from companies, which send a quantity of mail items, and transmits the acquired quantity information to the postal logistics operating block 200 and the real-time postal logistics delivery planning and managing block 300 through the first gateway 160.

From the formulation result of the primary delivery plan of the real-time postal logistics delivery planning and managing block 300, in a case of a general mail item, the mail-center-dispatch sorting work result acquiring and transmitting unit 130 acquires zip-code-based processing information from a sorting machine in order to have accurate scheduled quantity information by scheduled delivery date, delivery post offices delivery zone, and delivery route when the dispatch sorting work in the mail center is completed, and transmits the acquired information to the postal logistics operating block 200 and the real-time postal logistics delivery planning and managing block 300 through the first gateway 160.

The mail-center-arrival sorting work result acquiring and transmitting unit 140 acquires the zip-code-based processing information from the sorting machine when the dispatch sorting work in the mail center is completed, and transmits the acquired information to the postal logistics operating block 200 and the real-time postal logistics delivery planning and managing block 300 through the first gateway 160.

The delivery sequence sorting work result acquiring and transmitting unit 150 acquires postman-based and delivery-based processing information on the basis of the postman-based and delivery-sequence-based automatic sorting results from the sorting machine acquired by the mail center or the delivery post office, and transmits the acquired information to the real-time postal logistics delivery planning and managing block 300 through the first gateway 160.

The first gateway 160 interfaces between the postal logistics operating block 200 and the real-time postal logistics delivery planning and managing block 300.

The receipt and sorting work quantity information acquiring and transmitting block 100 further includes a quantity information classifying and transmitting unit (for convenience of explanation, not shown in the drawing) that classifies the quantity information acquired by the post office collection and receipt quantity information transmitting unit 110 and the quantity-of-postal-items receipt quantity information acquiring end transmitting unit 120, and transmits the classified quantity information to the postal logistics operating block 200 and the real-time postal logistics delivery planning and managing block 300 through the first gateway 160.

The quantity information classifying and transmitting unit classifies the quantity information according to a post office ID, delivery date and time, and receipt quantity, when the quantity information acquired through the registration of the quantity information of mail items collected from a mailbox by the post office and the quantity information found through the acquisition of the quantity information received at the post office and the mail center according to conditions from companies, which send a quantity of mail items, are information about the quantity of general mail items. The quantity information classifying and transmitting unit classifies the quantity information according to a registration number (customer ID+receipt number), a receipt post office ID, receipt date and time, recipient zip code, and mailing direction when the quantity information is information about the quantity of special mail items. In addition, the quantity information classifying and transmitting unit classifies the quantity information according to mailing direction, level of presorting (mail center ID, sorting machine ID, delivery post office ID, first 3 digits of the zip code, or 6 digits of the zip code), zip-code-based quantity, presence/absence of a barcode, receipt post office ID, and receipt date and time when the quantity information is information about a quantity of temporarily received or received quantity of mail items. Then, the quantity information classifying and transmitting unit acquires the receipt quantity information according to the classifications, and transmits the acquired receipt quantity information to the postal logistics operating block 200 and the real-time postal logistics delivery planning and managing block 300 through the first gateway 160.

The receipt and sorting work quantity information acquiring and transmitting block 100 further includes a unit (for convenience of explanation, not shown in the drawing) that generates information about the number of destination-based postal boxes through manual sorting, the result of presorting, and the result of zip-code-based dispatch sorting through automatic sorting.

Second, the postal logistics operating block 200 includes: a unit that compares the quantity information from the receipt and sorting work quantity information acquiring and transmitting block 100 with past delivery-post-office-based quantity information, and provides delivery-post-office-based quantity information; a unit that receives the result of the real-time postal logistics postal delivery work plan from the real-time postal logistics delivery planning and managing block 300, and calculates and manages a ratio of a delivery-post-office-based quantity according to the delivery-past-office-based execution result; and a unit that manages delivery-past-office-based traffic quality and workload according to the delivery result.

The configuration of the postal logistics operating block 200 will be described in detail. As shown in FIG. 1, the postal logistics operating block 200 includes a delivery-post-office-based scheduled quantity calculating unit 210 and a delivery-post-office-based actual result managing unit 220.

The delivery-post-office-based scheduled quantity calculating unit 210 receives the quantity information acquired by the receipt and sorting work quantity information acquiring and transmitting block 100, calculates a delivery-post-office-based scheduled arrival quantity according to the quantity of received general mail items on the basis of an increase ratio of mail items at the same time as in the past (e.g., month, day), and a ratio of delivery quantity information among the delivery post offices at the same time, calculates a delivery-post-office-based daily scheduled quantity on the basis of the zip-code-based quantity information, the level of presorting, and the quantity information using the quantity-of-postal-items receipt quantity information, and, in a case of a special mail item, generates scheduled quantity information to arrive at each delivery post office on the basis of a receipt date and a receipt post office. In addition, the delivery-post-office-based scheduled quantity calculating unit 210 compares the scheduled quantity information with the value registered in the delivery-past-office-based actual result managing unit 220, and transmits the comparison result to the real-time postal logistics delivery planning and managing block 300.

That is, the delivery-post-office-based scheduled quantity calculating unit 210 includes: a unit (for convenience of explanation, not shown in the drawing) that, when the information transmitted through the receipt and sorting work quantity information acquiring and transmitting block 100 is received, calculates a delivery-post-office-based scheduled arrival quantity according to the quantity of received general mail items on the basis of an increase ratio of mail items at the same time as in the past and a ratio of delivery quantity information among the delivery post offices at the same time; a unit (for convenience of explanation, not shown in the drawing) that calculates a delivery-post-office-based daily scheduled quantity on the basis of the zip-code-based quantity information, the level of presorting, and the quantity information using the quantity-of-postal-items receipt quantity information; and a delivery-post-office-based scheduled quantity calculating unit (for convenience of explanation, not shown in the drawing) that, in a case of a special mail item, generates scheduled quantity information to arrive at each delivery post office on the basis of a receipt date and a receipt post office. In addition, the delivery-post-office-based scheduled quantity calculating unit 210 further includes: a comparing unit (for convenience of explanation, not shown in the drawing) that compares the scheduled quantity information generated by the delivery-post-office-based scheduled quantity calculating unit with the value registered in the delivery-post-office-based actual result managing unit 220; and a unit (for convenience of explanation, not shown in the drawing) that transmits the comparison results by the comparing unit to the real-time postal logistics delivery planning and managing block 300 through a second gateway 310.

The delivery-post-office-based actual result managing unit 220 manages a ratio of past delivery-post-office-based delivery quantity information. That is, the delivery-post-office-based actual result managing unit 220 manages a weight value in consideration of a delivery route between a receipt post office and a delivery post office and time elapsed according to a work method in the mail center, and the ratio of the past delivery-post-office-based delivery quantity information on the basis of a scheduled delivery post office arrival date so as to classify a daily scheduled arrival quantity in consideration of an expected delay time (with the mail center work plan information), as the conditions, under which the delivery-post-office-based scheduled quantity calculating unit 210 calculates delivery-post-office-based scheduled distribution quantity.

Third, the real-time postal logistics delivery planning and managing block 300 includes: a unit that calculates accurate delivery-zone-based and delivery-route-based quantities using the quantity information acquired by the receipt and sorting work quantity information acquiring and transmitting block 100; a unit that calculates delivery-post-office-based and delivery-zone-based delivery workload using a quantity ratio according to the manual sorting result acquired by the postal logistics operating block 200, and generates and provides delivery quantity information with an error in delivery quantity that is minimized; a unit that, when mail items of more than a daily processable quantity arrive at each delivery post office, calculates entrusted delivery zones and entrusted delivery quantities for the quantity of mail items that are more than the processable quantity to effectively perform the delivery workload; a unit that calculates the quantity of mail items to be transported to the intermediate depositories in consideration of postman-based delivery quantity and delivery route, and calculates and provides an intermediate-location-based transport quantity; a unit that receives the transmission result, generates a travel route for collection, and provides a postman who conducts the collection work with the changed collection route; a unit that receives the transmission result, generates a travel route for collection, and provides a postman who conducts the collection work with the changed collection route; a unit that, in order to estimate the work quantity to be distributed according to the difference between the average quantity and the work quantity in formulating the work plan on the basis of the delivery quantity information, selects reference groups through comparison of a past actual delivery quantity with a delivery zone quantity, generates and transmits quantity information about mail items to be delivered, and formulates the delivery plan on the basis of the values (at this time, the information for calculating the delivery-zone-based delivery quantity is managed according to the average and maximum quantity delivery results); and a unit that manages traffic quality according to the delivery and collection work result and an entrusted (or residential) delivery result, and when the traffic quality is not repeatedly maintained, provides an administrator with information for postman supplement and delivery zone adjustment on the basis of delay factor information.

The configuration of the real-time postal logistics delivery planning and managing block 300 will now be described in detail. As shown in FIG. 1, the real-time postal logistics delivery planning and managing block 300 includes the second gateway 310, a daily scheduled arrival quantity sorting unit 311, a delivery-zone-based scheduled quantity calculating unit 312, a delivery-zone-based/delivery-route-based scheduled delivery quantity calculating unit 313, an excessive delivery workload detecting unit 314, an intermediate location transport quantity calculating unit 315, an entrusted and residential delivery area quantity calculating unit 316, a special mail item receipt result criterion delivery route generating unit 317, a special/general mail item delivery route generating unit 318, a delivery-zone-based delivery quantity estimating and adjusting unit 319, a message transmitting/receiving module 320, a mobile gateway 321, a returned and confirmed mail item collection location generating unit 322, a postman work result storing and delivery delay factor detecting unit 323, a collection work result registering unit 324, and a delivery zone and delivery-route-based actual result managing unit 325.

The delivery-zone-based scheduled quantity calculating unit 312 is a delivery-zone-based scheduled quantity result generating unit that, if the delivery-post-office-based scheduled quantity information is acquired, compares the ratio of the past delivery-zone-based delivery quantity information with data acquired from the receipt and collection quantity to calculate a delivery-zone-based scheduled postal delivery work quantity. That is, when the quantity information acquired by the receipt and sorting work quantity information acquiring and transmitting block 100 is received, in order to calculate the delivery-zone-based daily scheduled quantity, the delivery-zone-based scheduled quantity calculating unit 312 compares the ratio of the delivery-zone-based delivery quantity information from the details of the delivery zone and delivery-route-based actual result management (i.e., the information in the delivery zone and delivery-route-based actual result managing unit 325) generated by the postman work result storing and delivery delay factor detecting unit 323 with the data acquired from the receipt and collection quantity, to thereby calculate the delivery-zone-based scheduled postal delivery work quantity.

The delivery-zone-based/delivery-route-based scheduled delivery quantity calculating unit 313 receives the result calculated by the delivery-zone-based scheduled quantity calculating unit 312, and calculates the delivery-location-based scheduled delivery quantity using the ratio of the past delivery result of the delivery zones (reference groups) from the details of the delivery zone and delivery-refute-based actual result management (i.e., the information in the delivery zone and delivery-route-based actual result managing unit 325) and the ratio of the scheduled delivery quantity.

The excessive delivery workload detecting unit 314 detects a delivery zone, which suffers from excessive delivery workload, on the basis of the delivery-zone-based daily scheduled quantity from the result calculated by the delivery-bone-based/delivery-route-based scheduled delivery quantity calculating unit 313, and generates information for delivery zone adjustment, which has a function to select a delivery zone having a high delivery density.

When the entrusted and residential delivery area quantity calculating unit 316 operates, the intermediate location transport quantity calculating unit 315 transports daily general and special mail items, and calculates and provides the quantity of mail items to be transported to the intermediate depositories in consideration of the delivery-zone-based delivery quantity.

The entrusted and residential delivery area quantity calculating unit 316 confirms registration information of an entrusted/residential deliverable resource for an area having a high daily delivery density from the result calculated by the excessive delivery workload detecting unit 314, if the corresponding information exists, allocates scheduled delivery quantity information to an entrusted (residential) postal zone, and generates and transmits a scheduled delivery quantity to the entrusted (residential) postal zone. At this time, the real-time postal logistics delivery planning and managing block 300 may further include a unit (for convenience of explanation, not shown in the drawing) that, after the delivery quantity of the entrusted delivery zone is excluded through the delivery-zone-based/delivery-route-based scheduled delivery quantity calculating unit 313, the excessive delivery workload detecting unit 314, and the entrusted and residential delivery area quantity calculating unit 316, recalculates the delivery-zone-based delivery quantity.

The special mail item receipt result criterion delivery route generating unit 317 calculates zip-code-based quantity information for the special mail items, excluding the general mail items, from the result calculated by the entrusted and residential delivery area quantity calculating unit 316, calculates a delivery location using address information of a residence, and generates a delivery route on the basis of scheduled delivery completion time of the delivery location, such that traffic quality is maintained. In addition, the special mail item receipt result criterion delivery route generating unit 317 receives a response from the recipient who receives a message generated by the message transmitting/receiving module 320 by e-mail or message on a mobile phone, and reallocates a route for the special mail items in reflection of a customer name, a value of receipt request date-and-time value, and a delivery location among the receipt result through the mobile gateway 321.

The special/general mail item delivery route generating unit 318 generates a condition that satisfies the delivery completion time of special mail items by reflecting the delivery location information of general mail items in the delivery route generated by the special mail item receipt result criterion delivery route generating unit 317, and generates delivery route information including a delivery sequence of the general mail items in consideration of the generated condition. In addition, the special/general mail item delivery route generating unit 318 generates the delivery route according to the acquisition result (i.e., postman-based and delivery sequence-based processing information) by the receipt and sorting work quantity information acquiring and transmitting block 100 (i.e., the delivery sequence sorting work result acquiring and transmitting unit 150).

When the sorting work result by the mail center is received in order to generate the delivery plan, which is formulated according to the scheduled delivery quantity using accurate information, the delivery-zone-based delivery quantity estimating and adjusting unit 319 receives information about the number of destination-based postal boxes through manual sorting, the result of presorting, and the result of zip-code-based dispatch sorting and arrival sorting through automatic sorting from the receipt and sorting work quantity information acquiring and transmitting block 100 through the second gateway 310, compares changes in the delivery-zone-based quantity and calculates a difference in order to adjust a scheduled delivery post office arrival date and determine the scheduled delivery quantity as the delivery quantity, and generates a daily delivery quantity. The real-time postal logistics delivery planning and managing block 300 further includes a unit (for convenience of explanation, not shown in the drawing) that, when the difference in the changes of the delivery-zone-based delivery quantity calculated by the delivery-zone-based delivery quantity estimating and adjusting unit 319 is large, including when a special mail item delay factor occurs, checks a large-changed scheduled delivery quantity on the basis of the post office collection and receipt quantity and the quantity-of-postal-items receipt quantity, and if a difference in the ratio of the scheduled delivery quantity calculated based on the manual sorting quantity and the post office collection and receipt quantity is more than a predetermined reference value (e.g., 5%), recalculates the daily, delivery-zone-based, and delivery-route-based delivery quantities. In addition, the real-time postal logistics delivery planning and managing block 300 may further include a unit (for convenience of explanation, not shown in the drawing) that changes input date and time and quantity information, and repeatedly performs the generation of the delivery route so as to reformulate the delivery plan by reflecting the scheduled delivery quantity in the dispatch sorting and arrival sorting work result.

The delivery-zone-based delivery quantity estimating and adjusting unit 319 receives the zip-code-based arrival sorting result information from the receipt and sorting work quantity information acquiring and transmitting block 100 through the second gateway 310, compares the changes in the delivery-zone-based quantity and calculates the difference so as to determine the zip-code-based quantity as the delivery quantity of the delivery post office, and generates the daily delivery quantity.

The message transmitting/receiving module 320 checks a connection state to the mobile gateway 321 so as to transmit the generation result of the delivery route by the special mail item receipt result criterion delivery route generating unit 317 to the special mail item recipients through the recipient delivery schedule notification and confirmation result transmitting block 500, and generates and transmits a message for transmitting scheduled delivery date and time by e-mail or a message on a mobile phone. The message transmitting/receiving module 320 receives the delivery result from the delivery and collection work information acquiring and transmitting block 400 through the mobile gateway 321, and transmits the delivery result to the postman work result storing and delivery delay factor detecting unit 323.

The mobile gateway 321 interfaces between the delivery and collection work information acquiring and transmitting block 400 and the recipient delivery schedule notification and confirmation result transmitting block 500.

The returned and confirmed mail item collection location generating unit 322 generates and provides a travel route for the collection work. That is, the returned and confirmed mail item collection location generating unit 322 performs a process for collection work of returned and confirmed mail items. The returned and confirmed mail item collection location generating unit 322 generates a collection route so as to collect one or two unit delivery zones collected together or to be used along with a schedule for mailbox mail item collection, and provides a mail item collection vehicle or a person who is responsible for the collection work with collection route information.

The postman work result storing and delivery delay factor detecting unit 323 receives the delivery completion result transmitted from the delivery and collection work information acquiring and transmitting block 400 through the mobile gateway 321 and the message transmitting/receiving module 320, and registers the delivery completion result. The real-time postal logistics delivery planning and managing block 300 may further include a unit (for convenience of explanation, not shown in the drawing) that, when the delivery completion result is registered in the postman work result storing and delivery delay factor detecting unit 323, generates and stores information about a delivery location, to which a postman does not visit, and registers the corresponding delivery location as a delivery location at which collection is to be performed.

The postman work result storing and delivery delay factor detecting unit 323 compares the delivery and collection work results with the condition for maintaining the special mail item traffic quality generated before the delivery, and provides information about delay-delivered mail items.

The collection work result registering unit 324 registers the collection work result from the delivery and collection work information acquiring and transmitting block 400 (i.e., a returned/confirmed mail item collecting unit 403).

The delivery zone and delivery-route-based actual result managing unit 325 generates and registers ratios of delivery-zone-based and delivery-location-based delivery and collection (returned and confirmed) quantity information for calculation of the scheduled delivery quantity using history information of the delivery result.

The real-time postal logistics delivery planning and managing block 300 further includes a unit (hereinafter, referred to as "delivery plan formulating unit") (for convenience of explanation, not shown in the drawing) that formulates a delivery plan according to the calculation result of the scheduled delivery quantity. At this time, the delivery plan formulating unit includes a unit (for convenience of explanation, not shown in the drawing) that completes the foundation of the primary delivery plan based on the receipt information using the delivery route generated by the special/general mail item delivery route generating unit 318, and a unit (for convenience of explanation, not shown in the drawing) that compares the daily delivery quantity generated by the delivery-zone-based delivery quantity estimating and adjusting unit 319 with the received dispatch sorting work result, and changes the daily delivery quantity to determined delivery quantity information to formulate a secondary delivery plan.

The real-time postal logistics delivery planning and managing block 300 may further include a unit (for convenience of explanation, not shown in the drawing) that, in a case of a mail item that is received at a delivery post office and that is to be delivered in the corresponding zone, registers delivery quantity information such that the mail item is to be delivered the day after the receipt date, and reflects the delivery quantity information in formulating the delivery plan.

The real-time postal logistics delivery planning and managing block 300 may further include a unit (for convenience of explanation, not shown in the drawing) that provides the generated delivery route information, the calculation result of the intermediate depository transport quantity, and the calculation results of the quantities of the entrusted and residential delivery zones.

The real-time postal logistics delivery planning and managing block 300 may further include a unit (for convenience of explanation, not shown in the drawing) that registers delivery completion quantity and collection quantity information in the postal logistics operating block 200.

Fourth, the delivery and collection work information acquiring and transmitting block 400 includes: a unit that registers the delivery location by recognizing the barcode or the RFID tag attached to the collection box during the delivery work, and when the returned and confirmed mail items exist, acquires and registers a delivery-location-based returned and confirmed mail item collection quantity and recipient information; and a unit that transmits the information about the delivery completion location at predetermined time intervals during the delivery work, or when the delivery result is more than a predetermined quantity, transmits the delivery result to the real-time postal logistics delivery planning and managing block so as to generate a collection route for collecting the returned/confirmed mail item at a delivery location to which the postman does not visit during the delivery work.

The configuration of the delivery and collection work information acquiring and transmitting block 400 will now be described in detail. As shown in FIG. 1, the delivery and collection work information acquiring and transmitting block 400 includes a delivery and delivery confirmation information acquiring unit 401, a delivery completion location information transmitting unit 402, and the returned/confirmed mail item collecting unit 403.

The delivery and delivery confirmation information acquiring unit 401 recognizes the barcode or the RFID tag attached to the collection box and inputs the delivery quantity when only a general mail item is put into the collection box during the delivery work. Meanwhile, when a special mail item is put into the collection box, the delivery and delivery confirmation information acquiring unit 401 acquires delivery location information in signature information and delivery quantity information as delivery completion information. Here, the delivery work is performed by the postman according to the delivery route information, the calculation result of the intermediate depository transport quantity, and the calculation results of the quantities of the entrusted and residential delivery zones, all of which are generated by the real-time postal logistics delivery planning and managing block 300. In this case, when the postman performs the delivery work using the delivery route information from the real-time postal logistics delivery planning and managing block 300, the delivery and collection work information acquiring and transmitting block 400 may further include a unit (for convenience of explanation, not shown in the drawing) that causes the postman to put a mail item into the collection box, and in a case of a special mail item, to recognize a registration barcode (or an RFID tag) with a PDA, to display a screen for the signature of the recipient, and to register a delivery completion result after the signature of the recipient.

The delivery and delivery confirmation information acquiring unit 401 provides next scheduled delivery location information when the delivery is completed. When an unsorted mail item that is to be delivered before the next delivery location exists, the input of the delivery location information is performed by recognizing the barcode or the RFID tag attached to the collection box and inputting the delivery quantity at the corresponding delivery location, such that the delivery result information is acquired. The delivery and collection work information acquiring and transmitting block 400 may further include a unit (for convenience of explanation, not shown in the drawing) that, when a general mail item is put into the collection box or when a returned/confirmed mail item exists in the collection box, recognizes the barcode or the RFID tag attached to the collection box, and inputs a delivery quantity and a collection quantity.

While the delivery and delivery confirmation information acquiring unit 401 repeatedly operates, the delivery completion location information transmitting unit 402 transmits data of the delivery completion result to the real-time postal logistics delivery planning and managing block 300 in consideration of power of the PDA or the cumulative amount of the delivery completion information, and when the delivery is completed, registers the delivery completion information in the real-time postal logistics delivery planning and managing block 300. The delivery and collection work information acquiring and transmitting block 400 may further include a unit (for convenience of explanation, not shown in the drawing) that, while the delivery completion location information transmitting unit 402 operates, when a mail item is collected from a returned mail item box or a confirmed mail item box at a delivery location to which the postman visits, registers corresponding information through the PDA, and a unit (for convenience of explanation, not shown in the drawing) that, if the postman has some time to spare before returning to the delivery post office after completing the delivery, receives collection route information for an area neighboring the delivery completion location and performs the collection work before returning to the delivery post office.

The returned/confirmed mail item collecting unit 403 inputs information about a collected mail item quantity when a mail item to be collected exists at a delivery location on the collection route according to the collection route information transmitted from the real-time postal logistics delivery planning and managing block 300 (i.e., the returned and confirmed mail item collection location generating unit 322).

The system for planning and managing real-time postal delivery work having the above-described configuration according to the exemplary embodiment of the present invention acquires the receipt quantity information by mail item receipt location, time, and type, and determines the delivery-zone-based delivery work plan for each delivery post office using the previously generated result value of the delivery-zone-based delivery workload and the adjusted result value of the postal delivery workload based on the quantity information after the mail center performs the dispatch and arrival sorting work. Therefore, a factor for mail item delivery delay can be detected in advance, and accordingly, the quantity information for the entrusted and residential delivery zones can be generated and provided without causing the delivery delay. In addition, the workload can be adjusted and allocated in consideration of the delivery quantity, and a delivery plan can be formulated so as to prevent a mail item from being delay-collected and to eliminate the factor for delivery delay in advance.

The system for planning and managing real-time postal delivery work according to the exemplary embodiment of the present invention can partially calculate the delivery-location-based delivery quantity based on the sorting result information for determining the scheduled delivery post office arrival time when the arrival sorting is completed in the mail center, and can accurately determine the delivery-location-based delivery quantity when the delivery sequence sorting for delivery is completed in the mail center or a post center. Then, the system for planning and managing real-time postal delivery work according to the exemplary embodiment of the present invention generates the delivery route information using the determined information and provides the generated delivery route information to the postman. At this time, the delivery route information including the information about the quantity of mail items transported to the intermediate depositories on the postal zone-based delivery route is provided.

The system for planning and managing real-time postal delivery work according to the exemplary embodiment of the present invention receives the information acquired through the recognition of the barcode or the RFID tag attached to the collection box at a delivery location other than the delivery locations for which the postman is responsible, or the barcodes or the RFID tags attached to the collection boxes at all of the delivery locations while the system is executed, generates the collection route for the returned and confirmed mail items by postal zones using the received information, and generates and provides the mail item collection plan. In addition, the system calculates the quantity of returned and confirmed mail items when the collection work is completed through the recognition of the barcode or the RFID tag attached to the collection box during the collection work, and the calculated quantity as information about returned and confirmed workload, and manages the delivery quality on the basis of the total execution results.

Furthermore, the system for planning and managing real-time postal delivery work according to the exemplary embodiment of the present invention acquires the delivery plan information while a mail item is actually received and delivered, and generates and provides the delivery workload distribution result, the information about the delivery route, the collection route, and the like, and the information for primitive work plan adjustment such that the delivery delay does not occur even if an excess of workload occurs.

Figure 2:
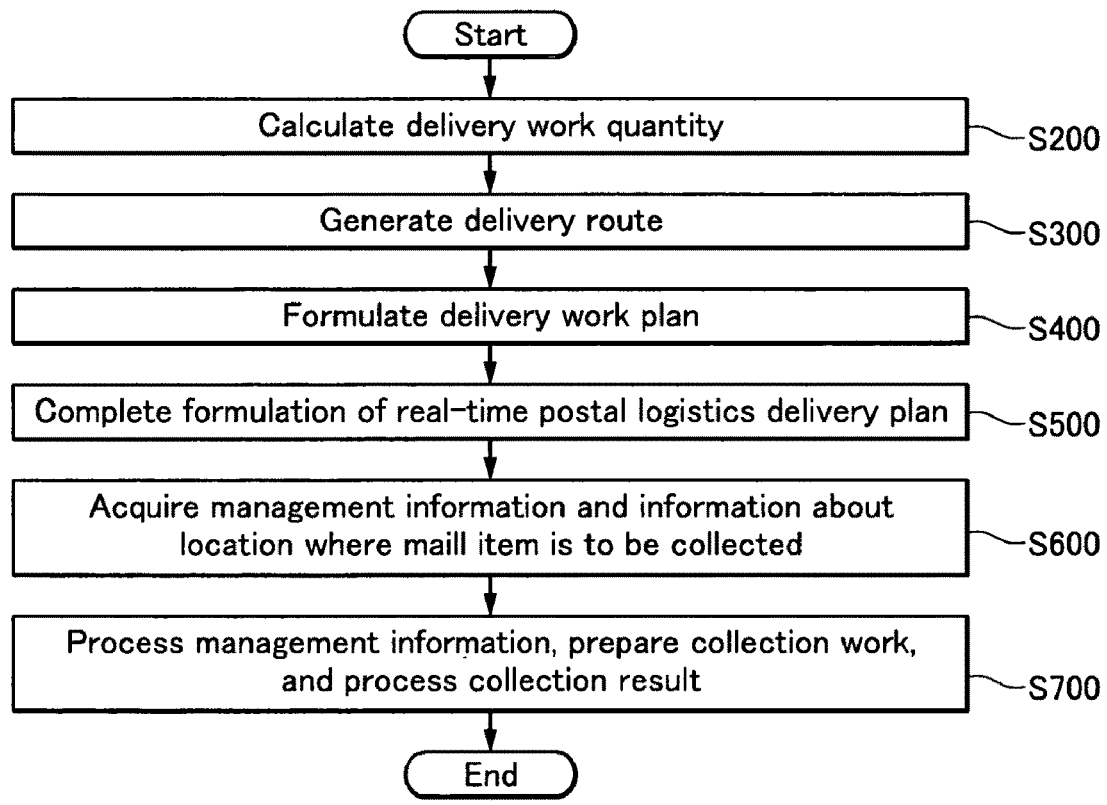
FIG. 2 is a flowchart showing a method of planning and managing real-time postal delivery work according to an exemplary embodiment of the present invention.

Hereinafter, a method of planning and managing real-time postal delivery work according to an exemplary embodiment of the present invention will be described with reference to a flowchart of FIG. 2.

First, in formulating a plan for real-time postal logistics postal delivery work according to an exemplary embodiment of the present invention, a postal delivery work quantity is calculated for formulating a delivery plan by calculating a scheduled delivery quantity using receipt and collection quantity information (step S200).

That is, when the information about the quantity of mail items individually received or collected at the post office, the letter type (non-standard or standard), the receipt date and time, the receipt post office information, and the mailing direction is disclosed or transmitted to the mail center, the receipt information is registered in the postal logistics information system (i.e., the receipt and sorting work quantity information acquiring and transmitting block 100), and the post office receipt information is transmitted to the real-time postal logistics delivery planning and managing block 300.

At this time, when the quantity of mail items are temporarily received or received, after information about a letter type (i.e., a logistics point ID, a sorting machine ID, 3 digits of the zip code, 6 digits of the zip code), presence/absence of a barcode, a zip-code-based quantity, a receipt post office, and receipt date and time is received, the information is classified by delivery post office, and the classified information is transmitted to the real-time postal logistics delivery planning and managing block 300.

Then, the delivery-zone-based and delivery-location-based scheduled quantities of the delivery post office are calculated from the post-office-based receipt quantity information received by the real-time postal logistics delivery planning and managing block 300 using the ratio of the delivery-post-office-based delivery quantity (ratio of mail center distribution quantity), the ratios of the delivery-zone-based and delivery-location-based delivery quantities of the post office, the ratios of monthly and weekday delivery-location-based delivery quantities with respect to the receipt quantity of the receipt post office calculated on the basis of the total receipt quantity and the past delivery quantity.

If quantity-of-postal-items receipt information is received from each mail center, the scheduled arrival date-based scheduled delivery quantity by delivery post office, delivery zone, and delivery location is calculated using quantity data by mail item receipt post office, date, work type, and zip code.

The calculation results of the delivery-post-office-based and delivery-zone-based delivery quantities from the delivery post office are compared with the delivery post office daily processing capability and delivery-zone-based deliverable quantity. Then, the quantity of mail items that exceed the delivery-zone-based processing capability of the delivery post office is calculated, a difference in the increase of the quantity of the entrusted or residential delivery zone is calculated, and the quantity of mail items to be transmitted to the postal zone-based intermediate depositories is calculated.

Next, in formulating of the plan for the real-time postal logistics postal delivery work according to the exemplary embodiment of the present invention, a delivery route is generated such that the special mail item delivery quality is maintained and the general mail items are transmitted along with the special mail items (step S300).

That is, the delivery route is generated to maintain the traffic quality on the basis of the special mail item receipt information from the calculation result of the delivery-post-office-based workload at S200, and the receipt date and time and the scheduled delivery completion date and time. That is, the scheduled delivery date and time is notified to the customer, and if a change request is received, a delivery route is generated in reflection of date and time to be changed.

Next, with regard to the postal delivery work plan that is generated based on the receipt quantity according to the exemplary embodiment of the present invention, the arrival quantity information is acquired to accurately formulate the postal delivery work plan for actual delivery (step S400).

Accordingly, in formulating the plan for the real-time postal logistics postal delivery work according to the exemplary embodiment of the present invention, the formulation of the real-time postal logistics delivery plan by delivery date or scheduled delivery date is completed (step S500).

That is, since the delivery workload is calculated on the basis of the scheduled delivery quantity at steps S200 and S300, in order to determine an accurate postal delivery work plan, when the work result is transmitted from the mail center to the real-time postal logistics delivery planning and managing block 300, if it differs from the quantity information that is used in the postal delivery work plan at steps S200 and S300, the adjustment by delivery post office and delivery zone is performed to complete the formulation of the delivery plan.

If a mail item has arrived at the delivery post office, the delivery sequence sorting work is performed through automatic sorting and manual sorting, and effective delivery-location-based quantity information according to the delivery sequence sorting work result and information about the generation result of the special mail item delivery receipt are acquired to generate the delivery route for the special mail items. Then, the delivery route for the general mail items is inserted to generate the entire delivery route.

In order to maintain the special mail item traffic quality, when the quantity of general mail items is large between the current delivery location and the next delivery location, and a factor for delay exists, the delivery sequence is changed, and a delivery route is generated and provided. At this time, with regard to the prescribed delivery route for the delivery zone quantity, for delivery workload distribution, the same operation is performed to generate and provided a delivery route.

Subsequently, information for acquiring and managing the delivery work based on the formulation result of the real-time postal logistics delivery plan according to the exemplary embodiment of the present invention and the execution result during the delivery work is acquired, and the information about the delivery location, at which a mail item is to be collected, is acquired (step S600).

Next, in the system for planning and managing real-time postal logistics postal delivery work according to the exemplary embodiment of the present invention, the information for delivery result management is processed, the collection work for a mail item to be collected is prepared, and the collection result is processed (step S700).

That is, through steps S400 and S500, the postman puts a mail item into the collection box, identifies the barcode or the RFID flag attached to the collection box, registers the delivery completion location information, and performs the delivery work and the collection work of the confirmed mail items. At this time, at the delivery location of the special mail item, the delivery confirmation operation (i.e., recipient signature input) is performed together. If the delivery for a predetermined number of delivery locations is completed, the delivery result information is transmitted to a delivery result monitoring system.

The delivery completion result received through the above-described operation is registered in the postal logistics operating block 200. Then, the real-time postal logistics delivery planning and managing block 300 that generates the route for collection of mail items (returned or confirmed mail items) generates the collection route while registering non-delivery location information as a point on the collection route. At this time, the collection work is performed according to the previously generated collection route, the barcode or the RFID tag attached to the collection box from which a mail item is to be collected is recognized during the collection work, and when a mail item to be collected exists, corresponding information is registered in the PDA. In addition, a next collection location is provided such that an uncollected mail item does not exist during the collection work.

In addition, the returned and confirmed mail items acquired during the collection work are transferred for the delivery work, and the information about the quantity of collected mail items is registered in the postal logistics operating block 200. At this time, the quantity information is reflected in calculating the delivery-post-office-based and delivery-zone-based quantities. In addition, when the postman has some time to spare before returning to the delivery post office after completing the delivery work, the postman receives the information about the collection route for the area neighboring the delivery completion location and further performs the collection work before returning to the delivery post office.

The result of the additional operation through the comparison of the information about the delivery location travel time, the delivery quantity, the intermediate depository travel time, the travel time for collection, and the collection quantity as the execution result according to the delivery plan is generated and then provided as the information for measuring the postman workability, the estimation criterion, and the level of the traffic quality. In addition, a method of providing information required for deliverability and traffic quality management and a method of utilizing records of delivery delay and overtime as reference information for factor analysis to maintain delivery quality are provided.

The daily delivery quantity according to the delivery result is stored, and the ratios of the reference groups (monthly, weekly, weekday, delivery-zone-based, and delivery-location-based delivery quantity) with respect to the total delivery quantity are generated. The generated weight values are used in calculating the delivery-post-office-based, delivery-zone-based, and delivery-location-based scheduled delivery quantities through the acquisition of the receipt quantity.

First, at step S200, in formulating the plan for the real-time postal logistics postal delivery work according to an exemplary embodiment of the present invention, a process of calculating the postal delivery work quantity for formulating the delivery plan by calculating the scheduled delivery quantity using the receipt and collection quantity information will be described in detail with reference to a flowchart of FIG. 3.

Figure 3:
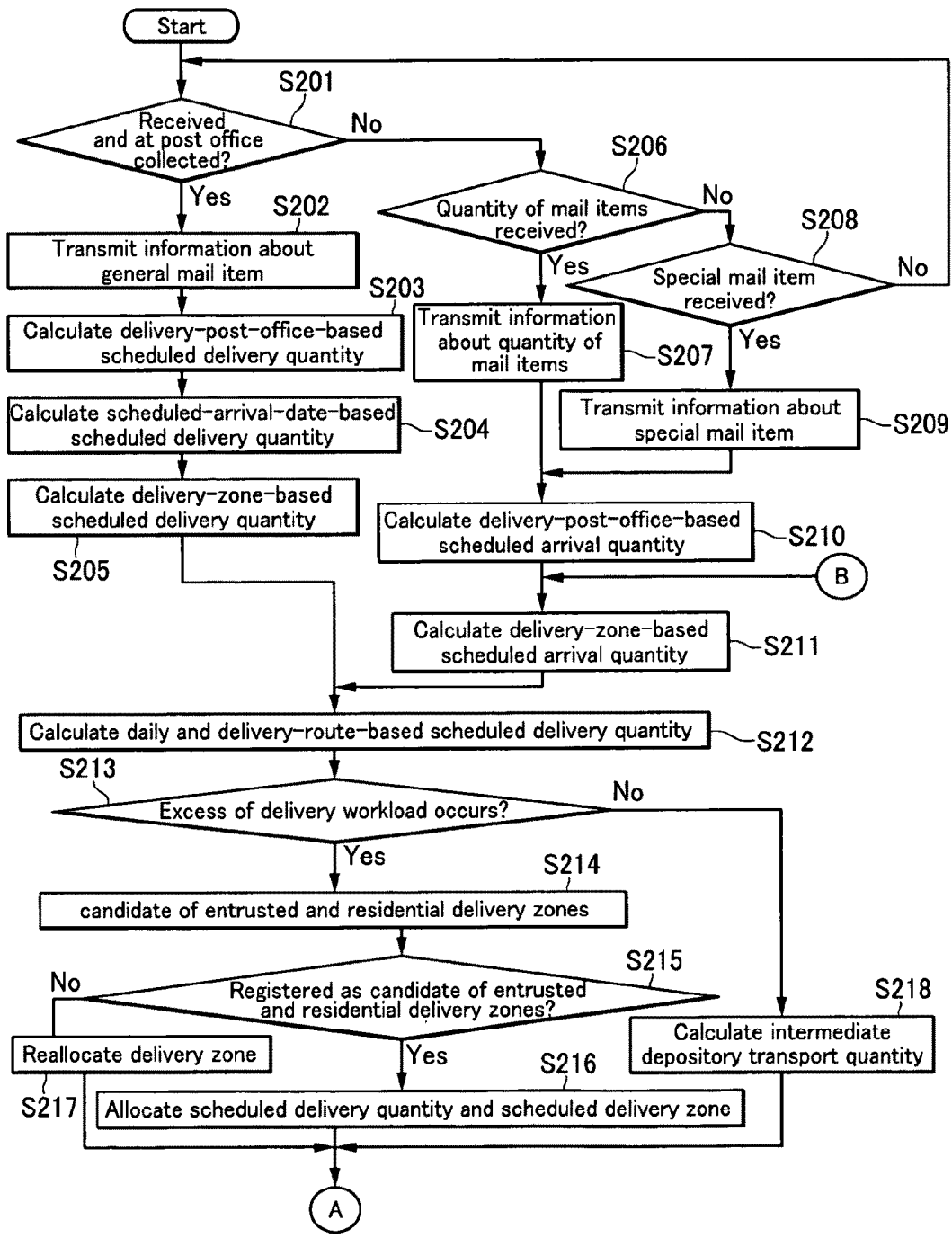
FIG. 3 is a flowchart showing an operation to calculate a postal delivery work quantity according to an exemplary embodiment of the present invention.

FIG. 3 is a flowchart showing an operation to calculate a postal delivery work quantity according to an exemplary embodiment of the present invention.

First, the post office collection and receipt quantity information transmitting unit 110 of the receipt and sorting work quantity information acquiring and transmitting block 100 acquires the post office receipt and collection quantity information when the post office completes the receipt of the individual mail items and the collection work of mail items of the mailbox (step S201).

Then, when the post office collection and receipt quantity information transmitting unit 110 acquires the post office receipt and collection quantity information, that is, acquires general mail items, the quantity information classifying and transmitting unit of the receipt and sorting work quantity information acquiring and transmitting block 100 transmits the receipt post office ID, the receipt date and time, the mailing direction, and the quantity information (including the collection quantity) to the postal logistics operating block 200 (step S202).

If the information about the completion of the receipt and collection through the post office is received, the delivery-post-office-based scheduled quantity calculating unit 210 of the postal logistics operating block 200 sorts the information by mailing direction and service. In a case of a general mail item, the delivery-post-office-based scheduled quantity calculating unit 210 calculates the delivery-post-office-based scheduled delivery quantity according to the ratio of the delivery post office arrival quantity at the same time as in the past (e.g., for three days) at the receipt post office with respect to the total receipt quantity (step S203), and calculates the scheduled arrival date-based scheduled delivery quantity at the receipt post office using the calculation result (step S204).

Then, the delivery-zone-based scheduled quantity calculating unit 312 of the real-time postal logistics delivery planning and managing block 300 calculates the daily (e.g., monthly or weekday) delivery-zone-based scheduled delivery quantity of the delivery post office on the basis of the monthly/weekly/weekday ratio of the past delivery-zone-based actual delivery result data (step S205).

Next, the quantity-of-postal-items receipt quantity information acquiring and transmitting unit 120 of the receipt and sorting work quantity information acquiring and transmitting block 100 acquires the quantity information of a quantity of mail items that are temporarily received or received at the post office and the mail center (logistics distribution center) (step S206).

After the above-described operation is performed, if the quantity information of the quantity of mail items is acquired, that is, if the quantity-of-postal-items receipt quantity information acquiring and transmitting unit 120 acquires the quantity information of the quantity of mail items either temporarily received or received, the quantity information classifying and transmitting unit transmits the receipt quantity information by receipt post office ID, receipt date and time, presorting (by mail center or postal zone), 3-digit or 6-digit sorting, and presence/absence of a barcode to the postal logistics operating block 200 (step S207).

Next, if a special mail item is received at the post office and the mail center, the receipt and sorting work quantity information acquiring and transmitting block 100 acquires the information about the received special mail item (step S208), and transmits the receipt information to the postal logistics operating block 200. At this time, when a special mail item is received, the quantity information classifying and transmitting unit transmits the information about the receipt post office ID, the registration number, and the recipient to the postal logistics operating block 200 (step S209).

Next, the delivery-post-office-based scheduled quantity calculating unit 210 calculates the delivery-post-office-based scheduled arrival quantity based on how many days the mail items are transported from the receipt post office and the dispatch mail center (here, including a transportation exchange center) to the arrival mail center (i.e., delivery post office), and the work time weight value using the receipt information of the quantity of mail items and the special mail item from the receipt and sorting work quantity information acquiring and transmitting block 100 (step S210). Next, the delivery-zone-based scheduled quantity calculating unit 312 calculates the delivery-zone-based scheduled delivery quantity using the calculation result at step S210 (step S211).

After steps S205 to S211 are performed, the delivery-zone-based/delivery-route-based scheduled delivery quantity calculating unit 313 of the real-time postal logistics delivery planning and managing block 300 calculates the daily and delivery-route-based scheduled delivery quantity on the basis of the monthly/weekly/weekday ratio of the delivery-location-based actual delivery result data on the past delivery route (step S212).

At this time, the excessive delivery workload detecting unit 314 of the real-time postal logistics delivery planning and managing block 300 checks whether or not the excess of delivery-zone-based delivery workload occurs, so as to check whether or not the factor for delivery delay exists (step S213).

At step S213, when the excess of delivery-zone-based delivery workload occurs, the excessive delivery workload detecting unit 314 selects a zone at which the excess of delivery workload occurs as the candidate of the entrusted and residential delivery zones (step S214). In addition, the entrusted and residential delivery area quantity calculating unit 316 of the real-time postal logistics delivery planning and managing block 300 checks whether or not the corresponding delivery zone is registered as the candidate of the entrusted or residential delivery zones on the scheduled delivery date (step S215).

At step S215, when the corresponding delivery zone is registered as the candidate of the entrusted and residential delivery zones, the scheduled delivery quantity and the scheduled delivery zone are allocated and notified (step S216). At step S215, when the corresponding delivery zone is not registered as the candidate of the entrusted and residential delivery zones, a postman is additionally supplemented, or allocation is performed to equalize the workload between the postman who is responsible for the delivery zone at which the excess of workload occurs, and a postman of a neighboring delivery zone at which the workload is small (step S217). That is, the delivery zones are reallocated in consideration of equalization postman-based delivery workload.

Meanwhile, at step S213, when the excess of delivery-zone-based delivery workload does not occur, pre-registration is performed in consideration of the quantity of the busiest period (i.e., days on which the delivery quantity cyclically becomes large) such that the entrusted and residential delivery zones can be constantly operated (step S218). That is, the intermediate location transport quantity calculating unit 315 of the real-time postal logistics delivery planning and managing block 300 calculates and provides the quantity of mail items to be transported to the delivery-zone-based (including existing entrusted and residential delivery zones) intermediate depositories.

Through the above-described operation, the delivery plan is formulated on the basis of the scheduled delivery quantity, and the primitive information for maintaining the traffic quality is generated, thereby providing the information for generating the delivery route.

Meanwhile, when the post office and the delivery post office are at the same location, and a mail item to be delivered to the same zone as the received zone is received, the scheduled delivery completion date is set within a predetermined period (e.g., two days). Then, at step S211, the calculation result of the delivery-zone-based scheduled delivery quantity is reflected in the delivery zone having a low delivery workload of the delivery post office and then reflected in the delivery plan. Subsequently, step S212 is performed.

Second, at step S300, in formulating the real-time postal logistics delivery plan according to the exemplary embodiment of the present invention, the operation to generate the delivery route such that the delivery quality of the special mail item is maintained and the general mail item is delivered along with the special mail item will be described in detail with reference to a flowchart of FIG. 4.

Figure 4:
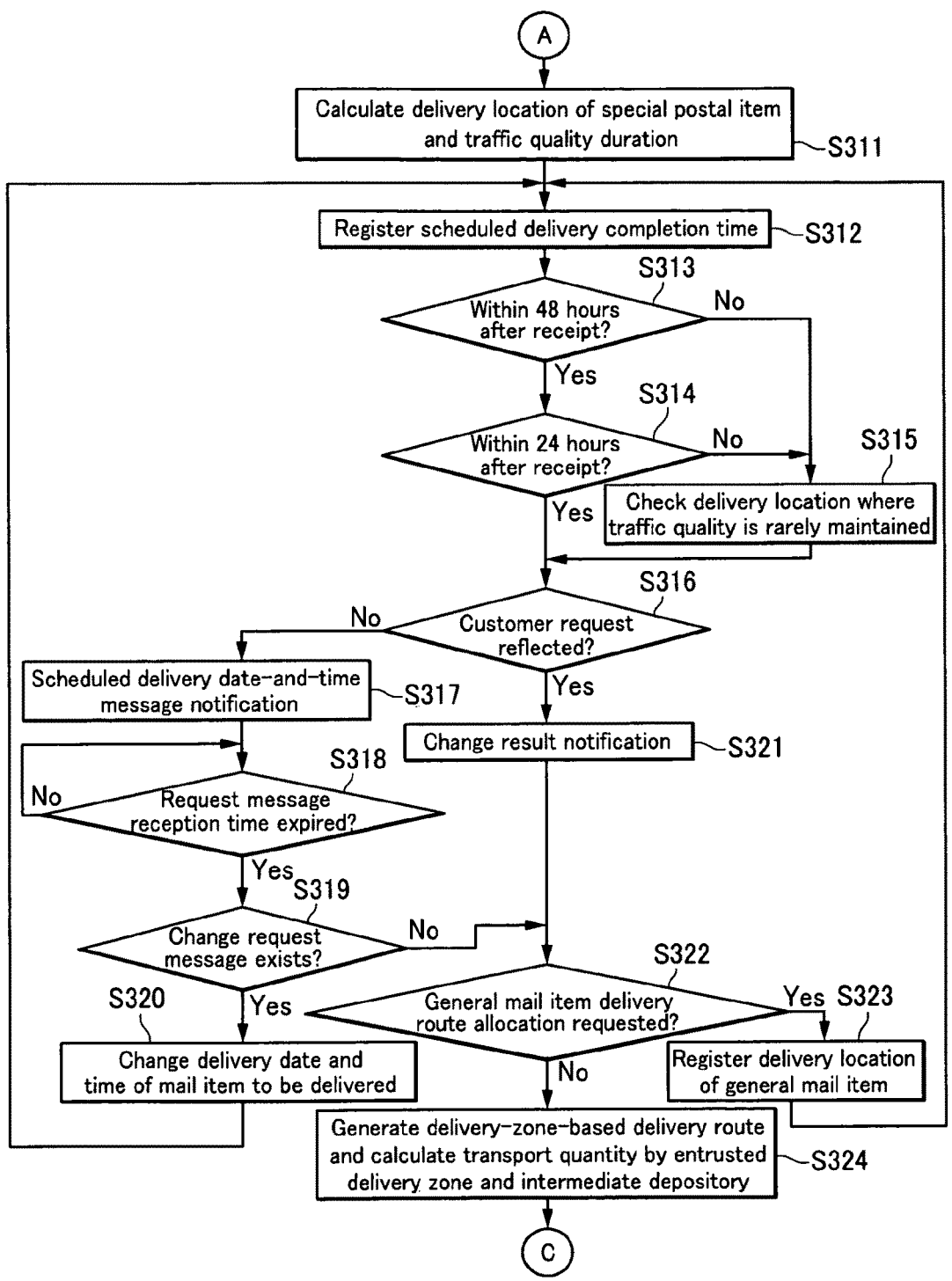
FIG. 4 is a flowchart showing an operation to generate a delivery route according to an exemplary embodiment of the present invention.

FIG. 4 is a flowchart showing an operation to generate a delivery route according to an exemplary embodiment of the present invention.

First, as shown in FIG. 3, the special mail item receipt result criterion delivery route generating unit 317 of the real-time postal logistics delivery planning and managing block 300 calculates the delivery location of the special mail item and the traffic quality duration from the generated scheduled delivery quantity (step S311), registers the scheduled delivery completion time at the coordinates of the delivery location (step S312), compares the receipt date and time in consideration of the travel time between the delivery locations, and generates the delivery route.

At this time, it is checked whether or not the condition that it is within a predetermined hours, for example about 48 hours, after the receipt is satisfied (step S313), and then it is checked whether or not the condition that it is within a predetermined hours, for example about 24 hours, after the receipt is satisfied (step S314). That is, the delivery route is generated so as to satisfy the conditions.

At step S313 or S314, when the condition is not satisfied, the condition on the travel time between the delivery locations is preferentially reflected, and a delivery location at which the special mail item delivery quality is not satisfied (i.e., a delivery location at which the traffic quality is rarely maintained) is detected and stored in a temporary storage. The delivery location at which the delivery quality is not maintained is provided to the operating system administrator, such that the administrator can check the delivery location (step S315).

At step S313 or S314, when the condition is satisfied, the delivery route of the special mail item is generated so as to satisfy the condition. If the delivery route is generated, it is checked whether or not the customer request is reflected (step S316). If the customer request is not reflected, the scheduled delivery completion time is notified to the customer. At this time, the reply expiration time and the message transmission method are also notified along with the scheduled delivery completion time. In a case of a call request, a person in charge generates and registers a message (step S317). That is, the message about the scheduled delivery date and time (e.g., e-mail or message on a mobile phone) is notified to the recipient of the special mail item.

Subsequently, it is checked whether or not the reply request time has expired (i.e., the request message receipt time has expired) (step S318). If the reply request time has expired, it is checked whether or not the reply message exists (i.e., whether or not the change request message exists) (step S319).

Next, the delivery request date and time and the registration number of the corresponding postal number are checked, and if they are correct, the delivery date and time of the mail item to be delivered, for which the change is requested by a message or a phone call, is changed (step S320). Next, the process returns to step S312, and at step S312, the above-described operation is performed again in reflection of the change result, and a delivery route is generated again such that the requested mail item is delivered at the appointed time.

Meanwhile, at step S316, if the customer request is reflected, the delivery route is allocated according to the appointed time, and the changed scheduled delivery date and time is notified to the corresponding customer (i.e., the recipient who requests the change of the delivery date and time of the special mail item) (step S321).

If it is confirmed at step S319 that the change request message does not exist, or if the operation at step S321 is completed, it is checked whether or not the allocation of the delivery route of the general mail item, which is to be delivered along with the special mail items, is requested (step S322).

At this time, at step S322, when the allocation of the delivery route of the general mail item is requested, the special/general mail item delivery route generating unit 318 of the real-time postal logistics delivery planning and managing block 300 registers information about a delivery location of the general mail item, which is to be delivered along with the special mail items, between the delivery locations of the special mail items (step S323). Next, the process returns to step S312, and at step S312, the above-described operation is performed again in reflection of the additional result of the delivery location of the general mail item between the delivery locations of the special mail items, thereby re-generating the delivery route.

At step S322, when the allocation of the delivery route of the general mail item is not requested, the intermediate location transport quantity calculating unit 315 of the real-time postal logistics delivery planning and managing block 300 generates the delivery-zone-based delivery route and calculates the entrusted delivery-zone-based and intermediate depository-based transport quantities (step S324). That is, the intermediate depository-based transport quantity is calculated by calculating the delivery quantity to be transported to the intermediate depository in consideration of the delivery quantity on the delivery route, and this fact is notified to a person who is responsible for transportation. Next, if the corresponding mail item has arrived at the delivery post office and the delivery sequence sorting work is completed, this is transmitted.

Third, as step S400, with regard to the delivery plan generated by the receipt information according to the exemplary embodiment of the present invention, an operation to accurately formulate the delivery plan for actual delivery by acquiring the arrival quantity information will be described in detail with reference to a flowchart of FIG. 5.

Figure 5:
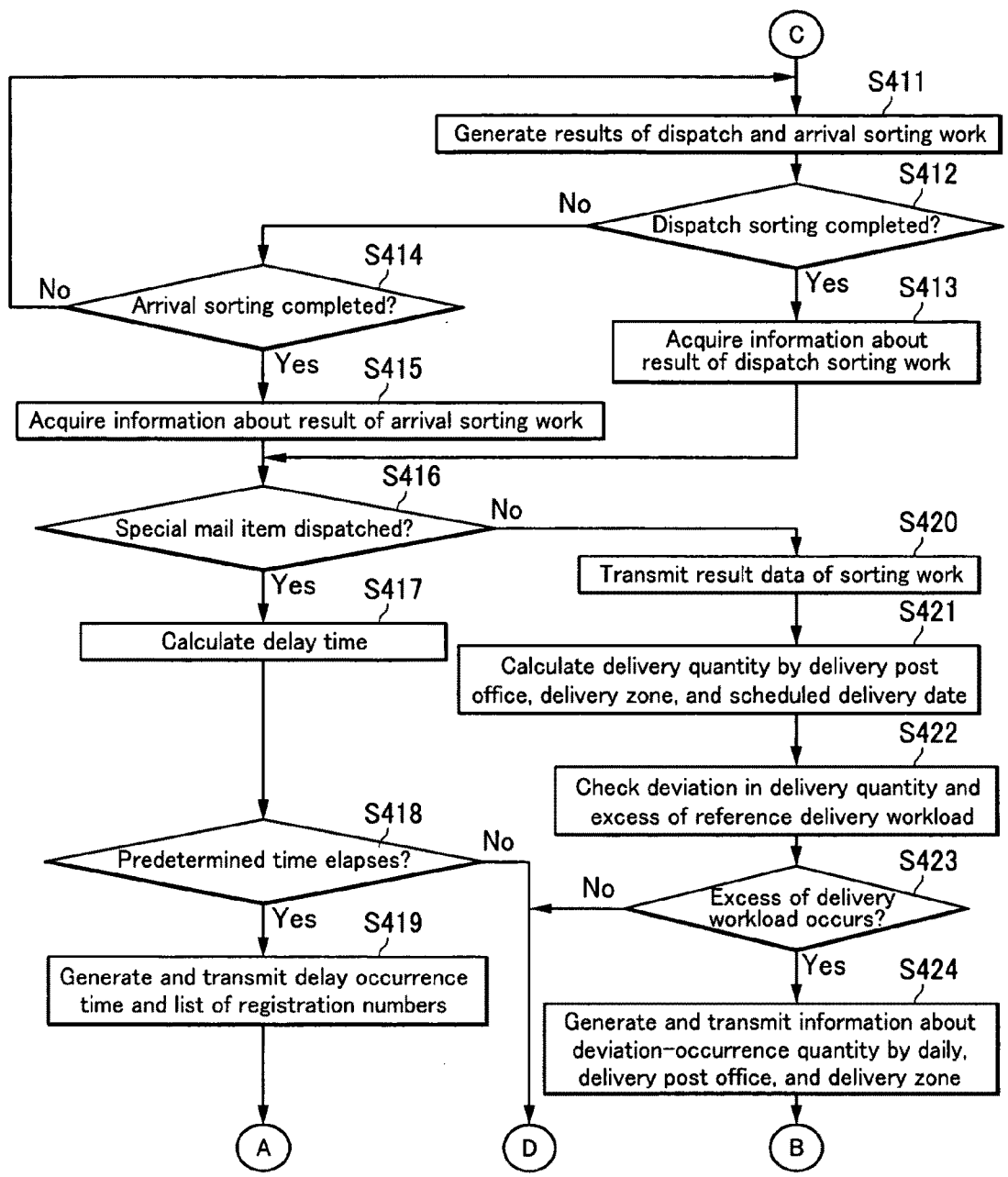
FIG. 5 is a flowchart showing an operation to formulate a postal delivery work plan according to an exemplary embodiment of the present invention.

FIG. 5 is a flowchart showing an operation to formulate a postal delivery work plan according to an exemplary embodiment of the present invention.

At step S400, the scheduled delivery quantity is calculated using the receipt quantity information acquired by the above-described operation, the dispatch sorting and arrival sorting results by the mail centers as the intermediate logistics processing locations are applied to the formulation result of the delivery plan before the actual delivery date to accurately the delivery-post-office-based and delivery date-based delivery plan. In addition, the delivery plan is adjusted by acquiring quantity information of mail items to be delay-arrived or additionally arrive at the delivery post office.

First, if the received mail item has arrived at the mail center or transported to a sorting workshop, the mail center performs the dispatch and arrival sorting work, and generates the result through automatic sorting from the sorting work results. That is, the mail center generates the results of the dispatch sorting and arrival sorting work (step S411).

At step S411, when a mail item that is not subject to automatic sorting is sorted manually, it is put into the postal box, transferred to a contracting workshop (i.e., a location where the postal box is loaded in a postal container), and dispatched through a transportation vehicle. At this time, the delivery and delivery confirmation information acquiring unit 401 of the delivery and collection work information acquiring and transmitting block 400 recognizes the barcode or the RFID tag (e.g., mail item type, performed/non-performed distinction of manual work, and destination) as the results of the manual sorting work, grasps the number of postal boxes (e.g., it is assumed for conversion that a single small box contains 450 mail items) to be transferred to the delivery post office or the mail center for the arrival sorting work, and converts the number of postal boxes into the delivery quantity.

During the manual work, in a case of the special mail item, after the manual sorting work is completed, the registration number is read and registered in the postal logistics operating block 200. At this time, information about the registration number, a processing post office ID, and processing date and time is acquired.

Meanwhile, it is checked whether or not automatic dispatch sorting is completed (step S412). If the dispatch sorting is completed, information about a mail center ID, processing completion date and time, mailing direction-based and zip-code-based quantities, a registration number, and the number of postal boxes (the quantity of the manual work) is acquired as the information of the automatic dispatch sorting work result (step S413).

It is checked whether or not automatic arrival sorting is completed (step S414). If the arrival sorting is completed, a mail center ID, processing completion date and time, mailing direction-based and zip-code-based quantities, a registration number, and the number of postal boxes (the quantity of the manual work) is acquired as the information of the automatic arrival sorting work result (step S415).

If the converted quantity information according to the manual work result is acquired and the automatic sorting processing is completed, it is checked whether a corresponding mail item is a special mail item or a general mail item (step S416). When a corresponding mail item is a special mail item, it is detected whether or not a factor for delayed arrival time exists, and the arrival time and the receipt date and time are compared with each other to calculate a delay time (step S417).

If the factor for delay exists, it is detected whether or not a predetermined time elapses, for example, the delay time is more than one hour (step S418). Then, the delay time (i.e., delay occurrence time) and the registration number information of the mail items (i.e., a list of registration numbers) are generated and transmitted to the real-time postal logistics delivery planning and managing block 300 (step S419).

Next, the process returns to step S311 shown in FIG. 4, and the real-time postal logistics delivery planning and managing block 300 re-generates the delivery route of the corresponding delivery post office or delivery zone on the basis of the received information.

Meanwhile, at step S416, in a case of a general mail item, the data of the sorting work result is transmitted to the postal logistics operating block 200 and the real-time postal logistics delivery planning and managing block 300 (step S420).

Accordingly, the delivery-zone-based delivery quantity estimating and adjusting unit 319 sorts the information through arrival sorting and dispatch sorting, and calculates the delivery quantity by delivery post office, delivery zone, and scheduled delivery date (step S421).

Next, the delivery-zone-based delivery quantity estimating and adjusting unit 319 checks a deviation in the dispatch sorting delivery quantity and an excess of reference delivery workload (step S422). Then, it is checked whether or not the excess of delivery workload occurs (step S423), and if so, only daily, delivery-post-office-based, and delivery-zone-based deviation-occurrence quantity information is generated and transmitted (step S424) so as to be reflected in the formulation of the delivery plan. That is, the process returns to step S211 shown in FIG. 3, and then at step S211, the delivery-zone-based scheduled delivery quantity is re-calculated.

In addition, the delivery-zone-based delivery quantity estimating and adjusting unit 319 checks a deviation in the arrival sorting delivery quantity and an excess of reference delivery workload. At this time, similarly to step S421, it is checked whether or not the excess of delivery workload occurs.

In the foregoing description, a process of providing the quantity information for delivery plan adjustment so as to generate the accurate delivery-post-office-based and delivery-zone-based delivery routes in reflection of the delivery quantity information generated by the above-described operation has been described.

Meanwhile, at step S418, when the delay time is not more than one hour, or at step S423, when the excess of delivery workload does not occur, an operation to complete the formulation of the real-time postal logistics delivery plan at step S500 (step S511 in FIG. 6) is performed.

Fourth, at step S500, in formulating the real-time postal logistics delivery plan according to the exemplary embodiment of the present invention, an operation to complete the formulation of the real-time postal logistics delivery plan on the basis of the delivery date or the scheduled delivery date will be described in detail with reference to a flowchart of FIG. 6.

Figure 6:
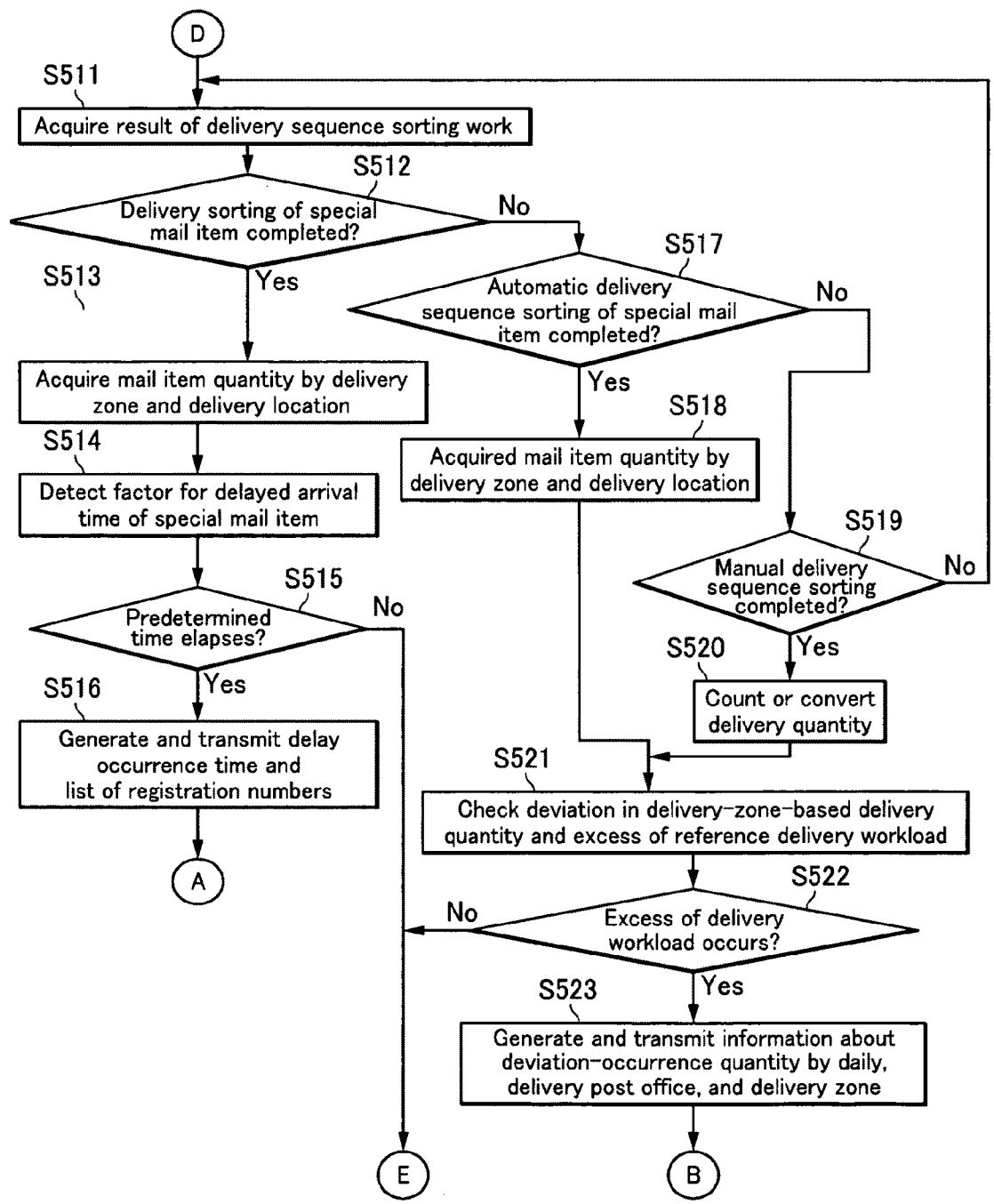
FIG. 6 is a flowchart showing an operation to complete formulation of a real-time postal logistics delivery plan according to an exemplary embodiment of the present invention.

FIG. 6 is a flowchart showing an operation to complete formulation of a real-time postal logistics delivery plan according to an exemplary embodiment of the present invention.

At step S500, similarly to the operation of FIG. 5, the adjustment result of the daily and delivery-zone-based delivery plan of each delivery post office is generated.

First, if sorting work of mail items to be delivered is completed through a delivery sequence sorting machine, which performs an operation to sort the mail items in a delivery sequence for the delivery locations in the mail center or the delivery post office, the result of the delivery sequence sorting work is acquired (step S511).

At this time, it is checked whether or not delivery sequence sorting work of special mail items is completed (step S512). When the delivery sequence sorting work of the special mail items is completed, the delivery-zone-based and delivery-location-based mail item quantities are acquired (step S513).

Next, it is detected whether or not a factor for delayed arrival time exists (step S514). If the factor for delay exists, it is checked whether or not a predetermined time elapses, for example, the delay time is more than one hour (step S515). When the delay time is as such, the delay occurrence time and the list of registration numbers of the postal numbers are generated and transmitted to the real-time postal logistics delivery planning and managing block 300 (step S516).

Next, the process returns to step S311 shown in FIG. 4. At step S311, the real-time postal logistics delivery planning and managing block 300 re-generates the delivery route of the corresponding delivery post office or delivery zone on the basis of the received information.

At step S512, if the delivery sequence sorting work of the special mail items through the manual work is not completed, it is checked whether or not automatic delivery sequence sorting of the special mail items is completed (step S517). When the automatic delivery sequence sorting of the special mail items is completed, the delivery-zone-based and delivery-location-based mail item quantities are acquired (step S518).

At step S517, if the automatic delivery sequence sorting of the special mail items is not completed, it is checked whether or not the manual delivery sequence sorting is completed (step S519). When the manual delivery sequence sorting is completed, the quantity is calculated through a delivery quantity counter by manual sorting result, or the mail items to be delivered are put into the postal boxes and converted into the quantity (step S520). At this time, at step S519, if the manual delivery sequence sorting is not completed, the process returns to step S511, and at step S511, the sorting work result is acquired.

Next, the delivery quantity information acquired at steps S518 and S520 is compared with the prescribed delivery-zone-based delivery quantity information, and a deviation in the delivery-zone-based delivery quantity deviation and an excess of delivery workload are checked (step S521).

At this time, it is checked whether or not the excess of the delivery-zone-based delivery workload occurs (step S522). If the excess of delivery workload occurs, daily, delivery-post-office-based, and delivery-zone-based deviation-occurrence quantity information is generated and transmitted as information for delivery plan adjustment (step S523), such that the information is reflected in the formulation of the delivery plan. That is, the process returns to step S211 shown in FIG. 3, and the delivery-zone-based scheduled delivery quantity is recalculated.

In the foregoing description, a process to generate the final information required for delivery plan adjustment through the above-described operation so as to be used in the delivery plan adjustment has been described.

Figure 7:
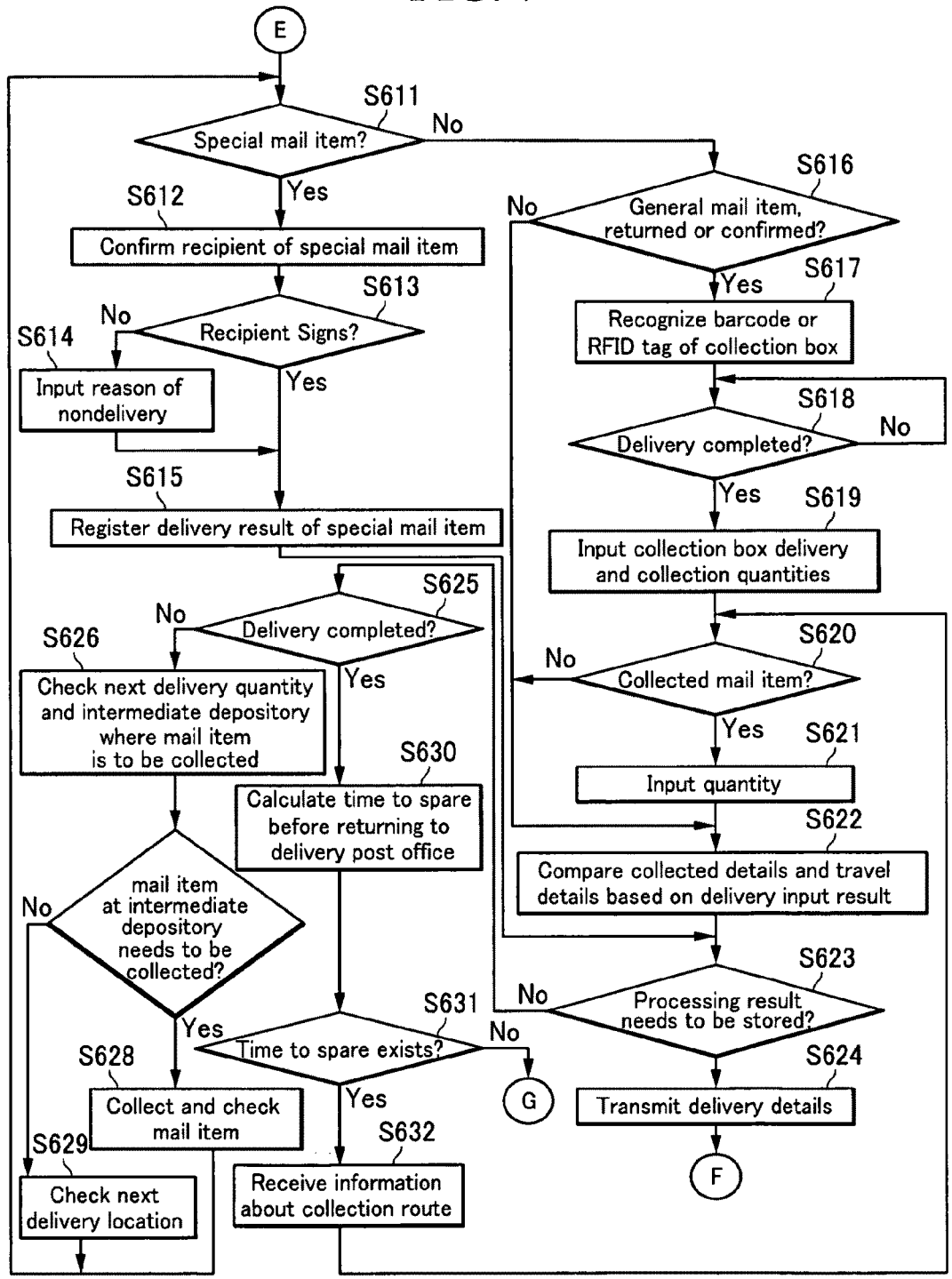
FIG. 7 is a flowchart showing an operation to acquire management information and information about a location at which a mail item is to be collected, according to an exemplary embodiment of the present invention.

Meanwhile, at step S515, when the delay time is not more than one hour, or at step S522, when the excess of delivery workload does not occur, an operation to acquire management information and information about a location at which a mail item is to be collected is performed at step S600 (step S611 of FIG. 7).

Fifth, at step S600, an operation to acquire information for acquiring and managing the delivery work based on formulation result of the real-time postal logistics delivery plan according to the exemplary embodiment of the present invention and the delivery work result and to acquire the information about the location at which a mail item is to be collected will be described in detail with reference to a flowchart of FIG. 7.

FIG. 7 is a flowchart showing an operation to acquire management information and information about a location at which a mail item is to be collected, according to an exemplary embodiment of the present invention.

At step S600, an operation to receive the delivery route information generated through steps S100 to S500 and to perform the delivery work through the delivery plan and the delivery is performed.

First, a postman moves to a delivery location so as to deliver the mail items according to the generated delivery route and then inputs information about whether or not the corresponding delivery location is a delivery location where a special mail item among mail items is to be delivered. At this time, the delivery and collection work information acquiring and transmitting block 400 checks according to the postman's input whether or not the corresponding delivery location is a delivery location where a special mail item is to be delivered (step S611).

At step S611, if the corresponding delivery location is a delivery location where a special mail item is to be delivered, a registration barcode on the mail item is read to confirm a recipient of the special mail item (step S612). In addition, it is checked whether or not the recipient signs (step S613). When the recipient is absent, or when the mail item cannot be transferred, a reason of nondelivery is selected and input (step S614). Then, the delivery of the special mail item is completed, and the delivery result of the special mail item is registered (step S615).

At step S611, when the corresponding delivery location is not a delivery location where a special mail item is to be delivered, it is checked whether or not a general mail item to be delivered exists in the collection box or whether or not a mail item exists in the returned and confirmed mailbox. It is checked whether or not mail items to be delivered and mail items to be collected exist (step S616), and if so, the barcode (i.e., the delivery location ID) or the RFID flag attached to the collection box is recognized (step S617). In addition, it is checked whether or not the delivery is completed (step S618), and if so, the delivery (referring to as "the collection box delivery") into the collection box and collection quantities are input (step S619).

Next, it is checked whether or not mail items to be collected exist (step S620), and if so, the mail items are collected, and the quantities of collected mail items by mailing direction and service are input. That is, the number of returned mail items and the number of confirmed mail items are input (step S621). Next, the collection details and the travel details are compared with each other based on the delivery input result on the PDA delivery software (step S622).

Accordingly, at step S615, when the delivery result of the special mail item is registered, or at step S622, when the comparison of the collection details and the travel details based on the delivery input result is completed, it is checked in consideration of power of the PDA whether or not the processing result needs to be stored (step S623).

At step S623, when the processing result needs to be stored, the delivery details are transmitted to the real-time postal logistics delivery planning and managing block 300 (Step S624). Next, at step S700 (step S701 of FIG. 8), an operation to process management information, prepare a collection work, and process a collection result is performed. Meanwhile, at step S623, when the processing result does not need to be stored, it is checked whether or not the delivery is completed (step S625).

At step S625, when the delivery is not completed, the next delivery quantity is checked and an intermediate depository where mail items are to be collected is searched (step S626). Then, it is checked whether or not the mail items of the intermediate depository are to be collected (step S627).

At step S627, when the mail items of the intermediate depository are to be collected, the postman moves to the intermediate depository, collects the mail items, and performs a confirmation procedure (i.e., read a barcode attached to the intermediate depository and automatically registers collection time information) (step S628). At step S627, when the mail items of the intermediate depository do not need to be collected, the postman checks the mail items to be delivered and the next delivery location transmitted from the PDA (step S629), and moves the next delivery location where the mail items to be delivered exist. Then, the process returns to step S611, and the above-described procedure is repeatedly performed.

Meanwhile, at step S625, when the postman completes the delivery work, before the postman returns to the delivery post office, time to spare of the postman is calculated (step S630), and it is checked whether or not the postman has time to spare (step S631). When the postman has time to spare, information about a collection route of an area neighboring the delivery completion location is received. Then, the process returns to step S620, and the postman performs the collection work again before returning to the delivery post office (step S632).

At step S631, when the postman does not have time to spare, the postman returns to the delivery post office. Then, the process returns to step S700 (step S721 of FIG. 8), and in the delivery post office, the delivery details according to the completion of the postal delivery work are stored, and the delivery result is registered.

Sixth, at step S700, an operation to process information for delivery result management, prepare collection work of mail items to be collected, and process a collection result in the system for planning and managing a real-time postal logistics delivery plan according to the exemplary embodiment of the present invention will be described in detail with reference to a flowchart of FIG. 8.

Figure 8:
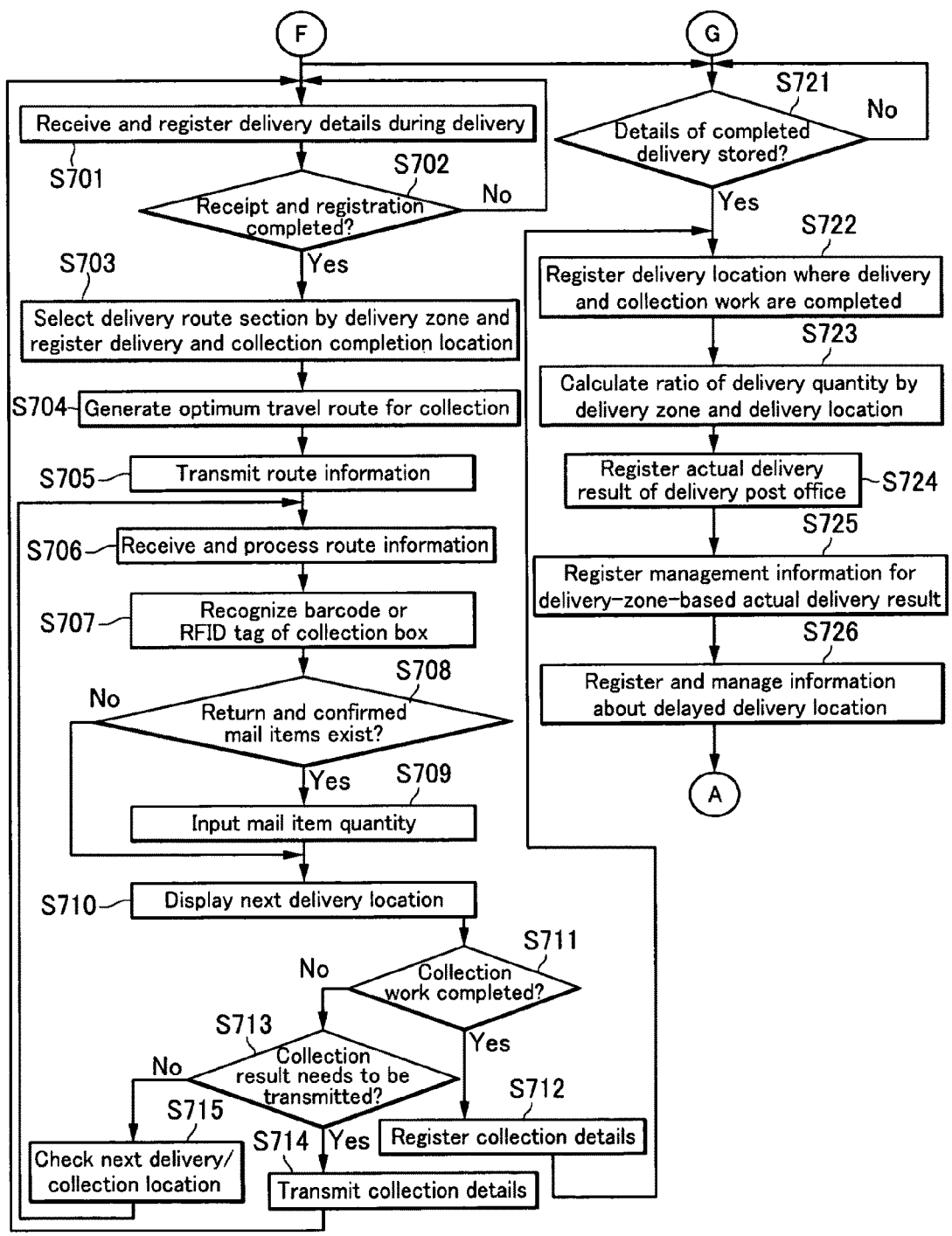
FIG. 8 is a flowchart showing an operation to process management information, prepare collection work, and process a collection result according to an exemplary embodiment of the present invention.

FIG. 8 is a flowchart showing an operation to process management information, prepare collection work, and process a collection result according to an exemplary embodiment of the present invention.

At step S700, an operation to register a delivery result transmitted during delivery work and an operation to store delivery details when postal delivery work is completed are performed.

First, the real-time postal logistics delivery planning and managing block 300 receives a delivery result from the delivery and collection work information acquiring and transmitting block 400 during a delivery-zone-based delivery work (i.e., delivery details during the delivery work) and registers the received delivery result (step S701).

At this time, it is checked whether or not the delivery details are received and registered (step S702), and if so, selection of a delivery-zone-based delivery route section and registration of delivery and collection completion locations are performed (step S703). Then, an optimum travel route for collection is generated using the coordinates of the delivery locations excluding the delivery and collection completion locations (Step S704).

In this way, if the collection route is completed, the route information (including information of a mailbox mail item collection location) is transmitted to a person who is responsible for mail item collection or another postman who is working to collect mail items in the same region (step S705). The route information is received through the delivery and collection work information acquiring and transmitting block 400 such that the person who is responsible for the corresponding result moves to the location where the mail item is to be collected (step S706). Then, at the corresponding delivery location, the barcode (i.e., a delivery location ID) or the RFID tag attached to the collection box is recognized (step S707).

At this time, it is checked whether or not returned and confirmed mail items exist (step S708), and if the returned and confirmed mail items exist, the mail items are collected, and then the mail item quantities by mailing direction and service are input (step S709).

Subsequently, positional information to the next delivery location is provided and displayed (step S710), and it is checked whether or not the collection work is completed (step S711). When the collection work is completed, completion is displayed, and then the postman returns to the delivery post office and registers the collection details (step S712).

Meanwhile, at step S711, when the collection work is not completed, it is checked whether or not a current collection result needs to be transmitted to the real-time postal logistics delivery planning and managing block 300 (step S713). If so, the collection details are transmitted (step S714), and then the process returns to step S701. At step S701, the delivery details during the delivery-zone-based delivery work are received and registered. In addition, if the current collection result does not need to be transmitted, the postman checks the next delivery/collection location transmitted from the PDA (step S715), and then the process returns to step S706. At step S706, the postman moves to the next delivery/collection location where the mail items to be delivered/collected exist and continues to perform the collection work.

Meanwhile, it is checked whether or not the operation to store the delivery details when the postal delivery work is completed is completed (step S721). If the delivery is completed and the details of the delivery result are stored, or at step S712, if the collection details are registered, the delivery location where the delivery/collection work is completed is registered (step S722), and an operation to generate an additional route for the collection work is performed. Then, the collection route is re-generated while excluding the delivery locations where the collection work is previously completed.

If the delivery completion location is registered, a ratio of deliverability of each delivery location to the total delivery quantity of the corresponding delivery zone is calculated. That is, the ratios of the delivery-zone-based and delivery-location-based delivery quantities are calculated (step S723). The calculated ratios of the delivery-zone-based and delivery-location-based delivery quantities are registered in the postal logistics operating block 200 as the actual delivery result of the delivery post office (step S724).

The information about delivery location arrival time, signature time, the delivery quantity, the collection quantity, the time elapsed for delivery from the delivery result is registered as the information for managing the delivery-zone-based actual delivery result (step S725). Then, the spatial mail item delivery quality condition and the delivery result are compared with each other, and information about a delayed delivery location is registered and managed (step S726).

Subsequently, the process returns to step S311 shown in FIG. 4, and the registration result is provided to the real-time postal logistics delivery planning and managing block 300, such that the registration result can be used as information for improvement of the delivery quality and reference information for equalization of delivery workload. Then, the delivery routes for the delivery post office and the delivery zone are generated on the basis of the received information.

Figure 9:
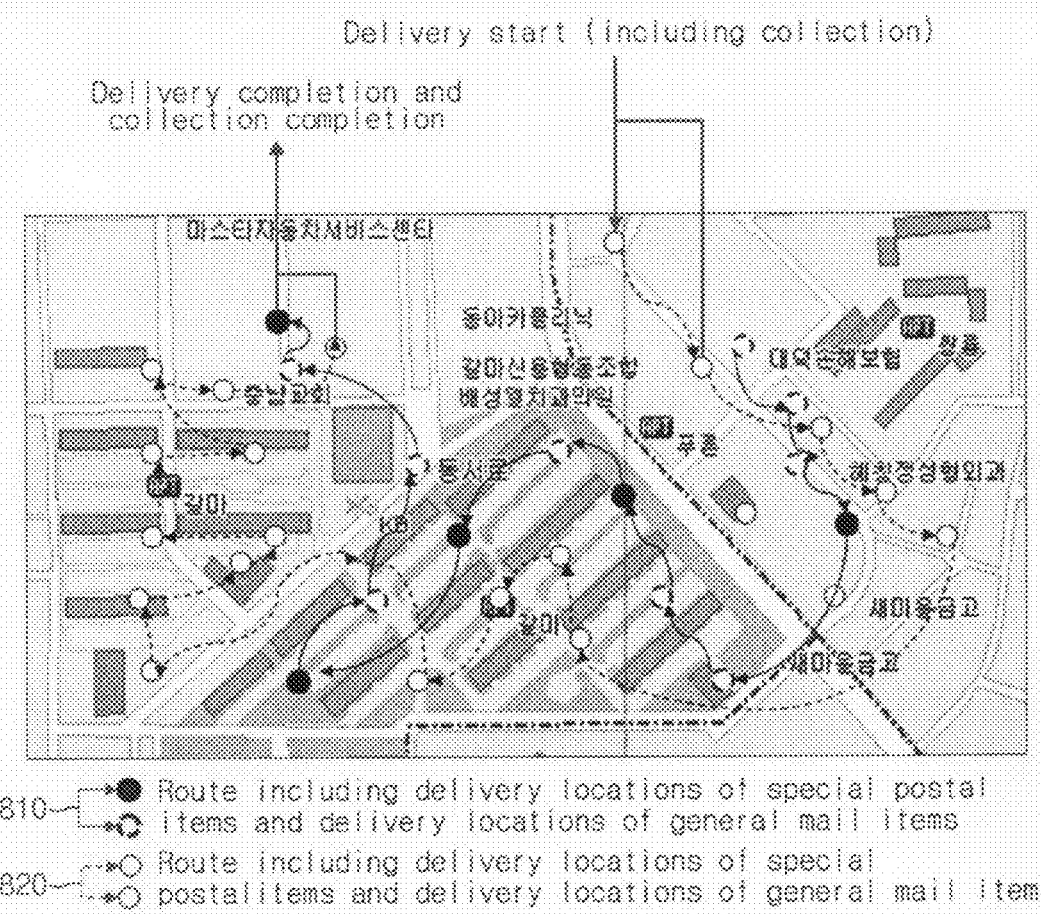
FIG. 9 is a diagram showing examples of a delivery route and a collection route that are generated by a system for planning and managing real-time postal logistics postal delivery work according to an exemplary embodiment of the present invention.

FIG. 9 is a diagram showing examples of a delivery route and a collection route that are generated by a system for planning and managing real-time postal logistics postal delivery work according to an exemplary embodiment of the present invention. Here, "S810" represents a route that includes special mail item delivery locations and general mail items delivery locations, and "S820" represents locations at which returned and confirmed mail items are to be collected, and a collection route.

From FIG. 9, it can be seen that mail items to be delivered do not pass through all of the delivery locations, and the number of delivery locations to visit to deliver the mail items may be changed according to whether the delivery quantity is large or small. At this time, the collection of the returned and confirmed mail items are collected at an appropriate time, and processed. Therefore, the postal service quality can be maintained, and the customer can perceive satisfaction.

According to the exemplary embodiment of the present invention, as described above, the delivery plan is formulated in consideration of the receipt quantity, the sorting work result, and the traffic quality. Accordingly, when the receipt quantity is rapidly increased, the factor for causing delivery delay by the excess of delivery workload is detected in advance. In addition, the information for maintaining the traffic quality using the entrusted or residential delivery method is generated and provided.

Like the related art, if the postman visits all of the delivery locations and performs the collection work of the returned and confirmed mail items during the mail item delivery work, it takes a lot of time to perform the postal delivery work, and the delivery quality of the special mail items is rarely maintained. Accordingly, the postman visits the delivery locations where the mail items to be delivered exist, and delivers the mail items and performs the collection work of the returned and confirmed mail items. In this case, however, delivery locations where the returned and confirmed mail items are not collected occur. In addition, since the returned and confirmed mail items are delay-collected, the customer does not perceive satisfaction with the postal service, which may become a target of public grievance. In contrast, according to the exemplary embodiment of the present invention, to overcome the problems inherent in the related art, the information about an unvisited location during the delivery work is acquired and used as the information for the collection work plan. Therefore, the returned/confirmed mail items can be stably collected and delivered according to the collection work plan.

According to the exemplary embodiment of the present invention, there has been described a case where the receipt (including collection) quantity information and the quantity information according to the dispatch sorting and arrival sorting work in the mail center are acquired, a daily and scheduled arrival time-based scheduled arrival quantity is calculated in real time, and the delivery plan and the delivery route are generated and provided. According to the exemplary embodiment of the present invention, there has been described a case where accurate delivery-post-office-based and delivery-zone-based quantities are calculated using the results of the dispatch sorting and arrival sorting work by the mail center, delivery-post-office-based and delivery-zone-based delivery workload are calculated using a quantity ratio according to the manual sorting result, and are generated, and delivery quantity information with an error in delivery quantity that is minimized is generated and provided.

According to the exemplary embodiment of the present invention, there has been described a case where, when mail items of more than a daily processable quantity arrive at each delivery post office, entrusted delivery zones and entrusted delivery quantities for the quantity of mail items of more than the processable quantity are calculated to effectively perform the delivery workload, the quantity of mail items to be transported to the intermediate depositories is calculated in consideration of postman-based delivery quantity and delivery route, and an intermediate-location-based transport quantity is calculated and provided. According to the exemplary embodiment of the present invention, there has been described a case where, with regard to the delivery work, the general mail items are sorted in the delivery sequence (based on the result of automatic sorting in the delivery sequence), the special mail items (subject to a delivery confirmation service) are also sorted in the delivery sequence, and the mail item delivery route is generated and provided in consideration of the condition for maintaining the special mail item traffic quality. There has also been described a case where, since the delivery route includes the manual sorting work result, and all of the delivery routes cannot be provided, the delivery location is registered by recognizing the barcode or the RFID tag attached to the collection box during the delivery work, and when the returned and confirmed mail items exist, the delivery-location-based returned and confirmed mail item collection quantity and recipient information are acquired and registered.

According to the exemplary embodiment of the present invention, there has been described a case when, to generate the collection route for the collection work of the returned and confirmed mail items at an unvisited delivery location during the delivery work, the information about the delivery completion location during the delivery work is transmitted to the real-time postal logistics delivery planning and managing block as the delivery result at predetermined time intervals, or when the delivery result is more than a predetermined quantity, and if the transmitted result is received, the travel route for collection is generated and provided to the person who conducts the collection work. According to the exemplary embodiment of the present invention, there has also been described a case where, in order to estimate the work quantity to be distributed according to the difference between the average quantity and the work quantity in formulating the work plan on the basis of the delivery quantity information, the reference groups are selected through comparison of the past actual delivery quantity with the delivery zone quantity, the quantity information about the mail items to be delivered is generated and provided, and the delivery plan is formulated on the basis of the values. At this time, the information for calculating the delivery-zone-based delivery quantity is managed according to the average and maximum quantity delivery results.

According to the exemplary embodiment of the present invention, there has been described a case where the traffic quality according to the delivery and collection work result and the entrusted (or residential) delivery result is managed, and when the traffic quality is not repeatedly maintained, the administrator is provided with information for postman supplement and delivery zone adjustment on the basis of delay factor information postman. According to the exemplary embodiment of the present invention, there has also been described a case where the delivery workload of the delivery post office can be effectively distributed by eliminating the factor for delivery delay in advance, the delivery plan for eliminating the factor for the deterioration of the postal service quality is generated in real time, and the execution result is managed.

The embodiment of the present invention described above is not implemented by only the method and apparatus, but it may be implemented by a program for executing the functions corresponding to the configuration of the exemplary embodiment of the present invention or a recording medium having recorded thereon the program. These implementations can be realized by the ordinary skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for planning and managing real-time postal delivery work, the device comprising:
   a receipt and sorting work quantity information acquiring and transmitting block that sorts quantity information by types after a post office and a mail center perform receipt, collection, and sorting work;
   a postal logistics operating block that transmits, to a terminal of each delivery post office, the quantity information from the receipt and sorting work quantity information acquiring and transmitting block to use as calculation criterion information of a scheduled delivery quantity for formulating a real-time delivery plan;
   a real-time postal logistics delivery planning and managing block that sorts the quantity information from the receipt and sorting work quantity information acquiring and transmitting block, performs calculation of delivery-zone-based and delivery-route-based scheduled delivery quantities, detection of an excess of delivery workload, calculation of the quantities of entrusted and residential delivery zones, and calculation of the quantities of delivery-zone-based intermediate depositories, generates a delivery route in consideration of a criterion date of special mail item traffic quality and then calculates a general mail item delivery quantity, and provides a terminal of a postman with information about the postal delivery work; and
   a delivery and collection work information acquiring and transmitting block that registers a delivery location and a delivery quantity through barcode or RFID tag recognition at a delivery completion location during the postal delivery work with reference to the delivery route and the quantity information generated by the real-time postal logistics delivery planning and managing block, confirms a collection box and registers information about a collection quantity at a delivery location at which collection is to be performed, during the collection work, and transmits the registration results to the real-time postal logistics delivery planning and managing block.

2. The device of claim 1, wherein the real-time postal logistics delivery planning and managing block allocates a collection route of a returned/confirmed mail item on the basis of information about delivery locations, excluding the delivery completion location, on the delivery-zone-based delivery route, and provides the collection route to the delivery and collection work information acquiring and transmitting block.

3. The device of claim 1, further comprising
   a unit that, when the work result of the delivery and collection work information acquiring and transmitting block is registered in the real-time postal logistics delivery planning and managing block, generates and registers delivery-zone-based and delivery-location-based daily weight values on the basis of the total delivery quantity and collection quantity according to the delivery and collection work result, and stores the registered result values in a temporary depository to be used in the real-time postal delivery plan logistics.

4. The device of claim 1, further comprising
   a unit that eliminates a factor for delivery delay in advance to distribute the delivery workload of the delivery post office, generates the real-time postal delivery plan for eliminating a factor for deterioration of postal service quality in advance, and manages the execution result.

5. The device of claim 1, further comprising
   a recipient delivery schedule notification and confirmation result transmitting block that, when a mail item is a special mail item, directly transmits the special mail item to a recipient, when a mail item is a mail item that requires confirmation, transmits information on scheduled delivery date and time based on the delivery route generation result to the recipient by e-mail or message on a mobile phone, and transmits the confirmation result from the recipient to the real-time postal logistics delivery planning and managing block.

6. The device of claim 1, wherein the receipt and sorting work quantity information acquiring and transmitting block comprises:
   a unit that acquires receipt quantity information and the quantity information according to the dispatch sorting and arrival sorting work in the mail center, calculates a daily and scheduled-arrival-time-based scheduled arrival quantity in real time, and generates and provides the delivery plan and the delivery route;
   a unit that provides the results of the dispatch sorting and arrival sorting work in the mail center; and
   a unit that provides quantity information according to the result of the sorting work in a delivery sequence of general mail items and the result of the sorting work in a delivery sequence of special mail items.

7. The device of claim 1, wherein the receipt and sorting work quantity information acquiring and transmitting block comprises:
   a post office collection and receipt quantity information transmitting unit that transmits quantity information, which is acquired through a registration process of information about a mailbox collection quantity by the post office, to the postal logistics operating block and the real-time postal logistics delivery planning and managing block;
   a quantity-of-postal-items receipt quantity information acquiring and transmitting unit that acquires quantity information in the post office and the mail center according to conditions from companies, which send a quantity of mail items, and transmits the acquired quantity information to the postal logistics operating block and the real-time postal logistics delivery planning and managing block;
   a mail-center-dispatch sorting work result acquiring and transmitting unit that, from the formulation result of the delivery plan of the real-time postal logistics delivery planning and managing block, in a case of a general mail item if the dispatch sorting work in the mail center is completed, acquires zip-code-based processing information from a sorting machine, and transmits the acquired information to the postal logistics operating block and the real-time postal logistics delivery planning and managing block;
   a mail-center-arrival sorting work result acquiring and transmitting unit that, if the arrival sorting work in the mail center is completed, acquires zip-code-based processing information from the sorting machine, and transmits the acquired information to the postal logistics operating block and the real-time postal logistics delivery planning and managing block;
   a delivery sequence sorting work result acquiring and transmitting unit that, on the basis of the postman-based and delivery-sequence-based automatic sorting results from the sorting machine acquired by the mail center or the delivery post office, acquires postman-based and delivery-based processing information, and transmits the acquired information to the real-time postal logistics delivery planning and managing block; and a first gateway that interfaces between the postal logistics operating block and the real-time postal logistics delivery planning and managing block.

8. The device of claim 7, wherein the receipt and sorting work quantity information acquiring and transmitting block further comprises a quantity information classifying and transmitting unit that classifies the quantity information acquired by the post office collection and receipt quantity information transmitting unit and the quantity-of-postal-items receipt quantity information acquiring and transmitting unit, and transmits the classified quantity information to the postal logistics operating block and the real-time postal logistics delivery planning and managing block.

9. The device of claim 8, wherein the quantity information classifying and transmitting unit classifies the quantity information according to a post office ID, delivery date and time, and a receipt quantity when the quantity information is information about the quantity of general mail items, classifies the quantity information according to a registration number (customer ID+receipt number), a receipt post office ID, receipt date and time, a recipient zip code, and a mailing direction when the quantity information is information about the quantity of special mail items, and classifies the quantity information according to a mailing direction, the level of presorting (mail center ID, sorting machine ID, delivery post office ID, first 3 digits of the zip code, or 6 digits of the zip code), a zip-code-based quantity, presence/absence of a barcode, a receipt post office ID, and receipt date and time when the quantity information is information about the quantity of temporarily received or received quantity of mail items, and acquires the receipt quantity information.

10. The device of claim 7, wherein the receipt and sorting work quantity information acquiring and transmitting block further comprises a unit that generates information about the number of destination-based postal boxes through manual sorting, the result of presorting, and the result of zip-code-based dispatch sorting through automatic sorting.

11. The device of claim 1, wherein the postal logistics operating block comprises:
a unit that compares the quantity information from the receipt and sorting work quantity information acquiring and transmitting block with past delivery-post-office-based quantity information, and provides delivery-post-office-based quantity information;
a unit that receives the result of a real-time postal logistics postal delivery work plan from the real-time postal logistics delivery planning and managing block, and calculates and manages a ratio of a delivery-post-office-based quantity according to the delivery-post-office-based execution result; and
a unit that manages delivery-post-office-based traffic quality and workload according to the delivery result.

12. The device of claim 1, wherein the postal logistics operating block comprises:
a delivery-post-office-based actual result managing unit that manages a weight value in consideration of a delivery route between a receipt post office and a delivery post office and time elapsed according to a work method in the mail center, and a ratio of past delivery-post-office-based delivery quantity information;
a unit that receives the information transmitted from the receipt and sorting work quantity information acquiring and transmitting block, and calculates a delivery-post-office-based scheduled arrival quantity according to the quantity of received general mail items on the basis of an increase ratio of mail items at the same time as in the past and a ratio of delivery quantity information among the delivery post offices at the same time;
a unit that calculates a delivery-post-office-based daily scheduled quantity on the basis of the zip-code-based quantity information, the level of presorting, and the quantity information using the quantity-of-postal-items receipt quantity information;
a delivery-post-office-based scheduled quantity calculating unit that, in a case of a special mail item, generates scheduled quantity information to arrive at each delivery post office on the basis of a receipt date and a receipt post office;
a comparing unit that compares the scheduled quantity information generated by the delivery-post-office-based scheduled quantity calculating unit with the value registered in the delivery-post-office-based actual result managing unit; and
a unit that transmits the comparison results by the comparing unit to the real-time postal logistics delivery planning and managing block through a second gateway.

13. The device of claim 1, wherein the real-time postal logistics delivery planning and managing block comprises:
a unit that calculates delivery-zone-based and delivery-route-based quantities using the quantity information acquired by the receipt and sorting work quantity information acquiring and transmitting block;
a unit that calculates delivery-post-office-based and delivery-zone-based delivery workload using a quantity ratio according to the manual sorting result acquired by the postal logistics operating block, and generates and transmits delivery quantity information with an error in delivery quantity that is minimized;
a unit that, when mail items of more than a daily processable quantity arrive at each delivery post office, calculates entrusted delivery zones and entrusted delivery quantities for the quantity of mail items that is more than the processable quantity to perform the delivery workload;
a unit that calculates the quantity of mail items to be transported to the intermediate depositories in consideration of postman-based delivery quantity and delivery route, and calculates and transmits an intermediate-location-based transport quantity;
a unit that generates delivery route information to include a general mail item delivery route in consideration of a condition for maintaining the special mail item traffic quality, and transmits the generated delivery route information;
a unit that receives the transmission result, generates a travel route for collection, and provides a postman who conducts the collection work with the changed collection route;
a unit that selects reference groups through comparison of a past actual delivery quantity with a delivery zone quantity, generates and transmits quantity information about mail items to be delivered, and formulates the delivery plan on the basis of the values; and
a unit that manages traffic quality according to the delivery and collection work result and an entrusted delivery result, and when the traffic quality is not repeatedly maintained, provides an administrator with information for postman supplement and delivery zone adjustment on the basis of delay factor information.

14. The device of claim 1, wherein the real-time postal logistics delivery planning and managing block comprises:

a delivery-zone-based scheduled quantity calculating unit that acquires delivery-post-office-based scheduled quantity information, and compares a ratio of past delivery-zone-based delivery quantity information with data acquired from the receipt and collection quantity to calculate a delivery-zone-based scheduled postal delivery work quantity;

a delivery-zone-based/delivery-route-based scheduled delivery quantity calculating unit that calculates a delivery-location-based scheduled delivery quantity using a ratio of a past daily delivery result and a ratio of a daily scheduled delivery quantity for each delivery zone;

an excessive delivery workload detecting unit that detects a delivery zone that suffers from excessive delivery workload, on the basis of a delivery-zone-based daily scheduled quantity, selects an area having a lower delivery density, and generates information for delivery zone adjustment;

an entrusted and residential delivery area quantity calculating unit that confirms registration information of an entrusted/residential deliverable resource for an area having a high daily delivery density from the result calculated by the excessive delivery workload detecting unit, if the corresponding information exists, allocates scheduled delivery quantity information to an entrusted postal zone, and generates and transmits a scheduled delivery quantity to the entrusted postal zone;

a unit that, after the delivery quantity of the entrusted delivery zone is excluded through the delivery-zone-based/delivery-route-based scheduled delivery quantity calculating unit, the excessive delivery workload detecting unit, and the entrusted and residential delivery area quantity calculating unit, recalculates the delivery-zone-based delivery quantity;

an intermediate-location-based transport quantity calculating unit that transports daily general and special mail items, and calculates and provides the quantity of mail items to be transported to the intermediate depositories in consideration of the delivery-zone-based delivery quantity;

a special mail item receipt result criterion delivery route generating unit that calculates zip-code-based quantity information for the special mail items, excluding the general mail items, calculates a delivery location using address information of a residence, generates a delivery route on the basis of scheduled delivery completion time of the delivery location such that traffic quality is maintained, and reallocates a route for the special mail items in reflection of a customer name, a value of receipt request date-and-time value, and a delivery location among the receipt result from a recipient;

a mobile gateway that interfaces between the delivery and collection work information acquiring and transmitting block and the recipient delivery schedule notification and confirmation result transmitting block;

a message transmitting/receiving module that checks a connection state of the mobile gateway so as to transmit the generation result of the delivery route by the special mail item receipt result criterion delivery route generating unit to the recipient through the recipient delivery schedule notification and confirmation result transmitting block, generates and transmits a message for transmitting a schedule delivery date-and-time message, and receives the delivery result from the delivery and collection work information acquiring and transmitting block; and a special/general mail item delivery route generating unit that generates a condition that satisfies the delivery completion time of special mail items by reflecting the delivery location information of general mail items in the delivery route generated by the special mail item receipt result criterion delivery route generating unit, generates delivery route information including a delivery sequence of the general mail items in consideration of the generated condition, and generates the delivery route according to the acquisition result by the receipt and sorting work quantity information acquiring and transmitting block.

15. The device of claim 14, wherein the real-time postal logistics delivery planning and managing block further comprises:

a delivery-zone-based delivery quantity estimating and adjusting unit that receives information about the number of destination-based postal boxes through manual sorting, the result of presorting, and the result of zip-code-based dispatch sorting and arrival sorting through automatic sorting from the receipt and sorting work quantity information acquiring and transmitting block, compares changes of the delivery-zone-based delivery quantity and calculates a difference so as to adjust a scheduled delivery post office arrival date and determine the scheduled delivery quantity as the delivery quantity, and generates a daily delivery quantity;

a unit that, when the difference in the changes of the delivery-zone-based delivery quantity calculated by the delivery-zone-based delivery quantity estimating and adjusting unit is large, including when a special mail item delay factor occurs, checks a large-changed scheduled delivery quantity on the basis of the post office collection and receipt quantity and the quantity-of-postal-items receipt quantity, and if a difference in the ratio of the scheduled delivery quantity calculated based on the manual sorting quantity and the post office collection and receipt quantity is more than a predetermined reference value, recalculates the daily, delivery-zone-based, and delivery-route-based delivery quantities;

a unit that changes input date and time and quantity information, and repeatedly performs the generation of the delivery route so as to reformulate the delivery plan by reflecting the scheduled delivery quantity in the dispatch sorting and arrival sorting work result;

a unit that, in a case of a mail item that is received at a delivery post office and is to be delivered in the corresponding zone, registers delivery quantity information such that the mail item is to be delivered the day after the receipt date, and reflects the delivery quantity information in formulating the delivery plan; and a unit that provides the delivery route information, the calculation result of the intermediate depository transport quantity, and the calculation results of the quantities of the entrusted and residential delivery zones.

16. The device of claim 14, wherein the real-time postal logistics delivery planning and managing block further comprises:

a returned and confirmed mail item collection location generating unit that generates a travel route for the collection work and provides a mail item collection vehicle and a person who is responsible for the collection work with collection route information;

a collection work result registering unit that registers a collection work result input from the delivery and collection work information acquiring and transmitting block;

a unit that, when the delivery completion result is registered in the postman work result storing and delivery delay factor detecting unit, generates and stores information about a delivery location to which a postman does not visit, and registers the corresponding delivery location as a delivery location at which collection is to be performed;

a unit that registers delivery completion quantity and collection quantity information in the postal logistics operating block;

a postman work result storing and delivery delay factor detecting unit that receives the delivery completion result transmitted from the delivery and collection work information acquiring and transmitting block, registers the delivery completion result, compares the delivery and collection work result with the condition for maintaining the special mail item traffic quality generated before the delivery, and provides information about delay-delivered mail items; and a delivery zone and delivery-route-based actual result managing unit that generates and registers ratios of delivery-zone-based and delivery-location-based delivery and collection quantity information for calculation of the scheduled delivery quantity using history information of the delivery result.

17. The device of claim 14, wherein the real-time postal logistics delivery planning and managing block further comprises:

a unit that formulates a primary delivery plan based on receipt information using the information generated by the special/general mail item delivery route generating unit; and a unit that compares the daily delivery quantity generated by the delivery-zone-based delivery quantity estimating and adjusting unit with the received dispatch sorting work result, and changes the daily delivery quantity to determined delivery quantity information to formulate a secondary delivery plan.

18. The device of claim 1, wherein the delivery and collection work information acquiring and transmitting block comprises:

a unit that registers the delivery location by recognizing the barcode or the RFID tag attached to the collection box during the delivery, and when the returned and confirmed mail items exist, acquires and registers a delivery-location-based returned and confirmed mail item collection quantity and recipient information; and a unit that transmits the information about the delivery completion location at predetermined time intervals during the delivery, or when the delivery result is more than a predetermined quantity, transmits the delivery result to the real-time postal logistics delivery planning and managing block so as to generate a collection route for collecting the returned/confirmed mail item at a delivery location at which the postman does not visit during the delivery.

19. The device of claim 1, wherein the delivery and collection work information acquiring and transmitting block comprises:

a delivery and delivery confirmation information acquiring unit that, when only a general mail item is put into the collection box during the delivery, recognizes the barcode or the RFID tag attached to the collection box and inputs the delivery quantity, and when a special mail item is put into the collection box, acquires delivery location information in signature information and delivery quantity information as delivery completion information, and provides next scheduled delivery location information when the delivery is completed;

a unit that, when the postman delivers mail items using the delivery route information from the real-time postal logistics delivery planning and managing block, causes the postman to put a mail item into the collection box and in a case of a special mail item, to recognize with a PDA a registration barcode or an RFID tag, to display a screen for the signature of the recipient, and to register a delivery completion result after the signature of the recipient;

a unit that, when a general mail item is put into the collection box or when a returned/confirmed mail item exists in the collection box, recognizes the barcode or the RFID tag attached to the collection box, and inputs a delivery quantity and a collection quantity;

a delivery completion location information transmitting unit that transmits data of the delivery completion result to the real-time postal logistics delivery planning and managing block in consideration of power of the PDA or the cumulative amount of the delivery completion information, and when the delivery is completed, registers the delivery completion information in the real-time postal logistics delivery planning and managing block;

a returned/confirmed mail item collecting unit that, when a mail item to be collected exists at a delivery location on the collection route according to the collection route information transmitted from the real-time postal logistics delivery planning and managing block, inputs information about a collected mail item quantity;

a unit that, when a mail item is collected from a returned mail item box or a confirmed mail item box at a delivery location that the postman visits, registers corresponding information through the PDA; and a unit that, after completing the delivery, receives collection route information for an area neighboring the delivery completion location and performs the collection work before returning to the delivery post office.

* * * * *